(12) United States Patent
Shi et al.

(10) Patent No.: US 12,167,134 B2
(45) Date of Patent: *Dec. 10, 2024

(54) VIDEO STABILIZATION

(71) Applicant: Google LLC, Mountain View, CA (US)

(72) Inventors: Fuhao Shi, San Jose, CA (US); Chia-Kai Liang, San Jose, CA (US); Xue Tu, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,812

(22) Filed: Jun. 16, 2023

(65) Prior Publication Data

US 2023/0336873 A1  Oct. 19, 2023

Related U.S. Application Data

(63) Continuation of application No. 17/336,194, filed on Jun. 1, 2021, now Pat. No. 11,683,586, which is a
(Continued)

(51) Int. Cl.
*H04N 23/68* (2023.01)
*G06T 5/50* (2006.01)
(Continued)

(52) U.S. Cl.
CPC ............ *H04N 23/687* (2023.01); *G06T 5/50* (2013.01); *G06T 5/73* (2024.01); *G06T 7/246* (2017.01);
(Continued)

(58) Field of Classification Search
CPC ............ H04N 23/687; H04N 23/6811; H04N 23/6812; H04N 23/683; G06T 5/50;
(Continued)

(56) References Cited

U.S. PATENT DOCUMENTS 4,637,571 A   1/1987 Holder et al.
5,053,876 A   10/1991 Blissett et al.
(Continued)

FOREIGN PATENT DOCUMENTS

CN   101473266   7/2009
CN   103853908   6/2014
(Continued)

OTHER PUBLICATIONS

Zhou et al., "A Fingerprint Image Enhancement Algorithm Based on Stretching Transfer Function," IOP Conf. Series: Journal of Physics: Conf. Series 1302, Aug. 2019, 7 pages.
(Continued)

*Primary Examiner* — Albert H Cutler
(74) *Attorney, Agent, or Firm* — McDonnell Boehnen Hulbert & Berghoff LLP

(57) ABSTRACT

Methods, systems, and apparatus, including computer programs stored on a computer-readable storage medium, for video stabilization. In some implementations, a computer system obtains frames of a video captured by a recording device using an optical image stabilization (OIS) system. The computing system receives (i) OIS position data indicating positions of the OIS system during capture of the frames, and (ii) device position data indicating positions of the recording device during capture of the frames. The computing system determines a first transformation for a particular frame based on the OIS position data for the particular frame and device position data for the particular frame. The computing system determines a second transformation for the particular frame based on the first transformation and positions of the recording device occurring after capture of the particular frame. The computing system generates a stabilized version of the particular frame using the second transformation.

18 Claims, 5 Drawing Sheets

Related U.S. Application Data continuation of application No. 16/568,931, filed on Sep. 12, 2019, now Pat. No. 11,064,119, which is a continuation of application No. 15/724,241, filed on Oct. 3, 2017, now Pat. No. 10,462,370.

(51) Int. Cl.
*G06T 5/73* (2024.01)
*G06T 7/246* (2017.01)

(52) U.S. Cl.
CPC ..... *H04N 23/6811* (2023.01); *H04N 23/6812* (2023.01); *H04N 23/683* (2023.01); *G06T 2207/10016* (2013.01); *G06T 2207/20201* (2013.01)

(58) Field of Classification Search
CPC . G06T 5/73; G06T 7/246; G06T 2207/10016; G06T 2207/20201
See application file for complete search history.

(56) References Cited

U.S. PATENT DOCUMENTS

| | | | |
|---|---|---|---|
| 7,643,062 B2 | 1/2010 | Silverstein et al. |
| 7,697,725 B2 | 4/2010 | Burns et al. |
| 7,796,872 B2 | 9/2010 | Sachs et al. |
| 8,009,872 B2 | 8/2011 | Kurata |
| 8,009,971 B2 | 8/2011 | Koo et al. |
| 8,379,932 B2 | 2/2013 | Fukunishi |
| 8,493,459 B2 | 7/2013 | Albu |
| 8,553,275 B2 | 10/2013 | Conlon et al. |
| 8,711,233 B2 | 4/2014 | Jefremov et al. |
| 8,743,222 B2 | 6/2014 | Hamalainen |
| 8,913,140 B2 | 12/2014 | Zhou |
| 9,002,068 B2 | 4/2015 | Wang |
| 9,100,575 B2 | 8/2015 | Lee et al. |
| 9,185,291 B1 | 11/2015 | Shabtay et al. |
| 9,232,138 B1 | 1/2016 | Baldwin |
| 9,280,810 B2 | 3/2016 | Stec et al. |
| 9,292,734 B2 | 3/2016 | Zhu et al. |
| 9,392,188 B2 | 7/2016 | Shabtay et al. |
| 9,402,032 B2 | 7/2016 | Dror et al. |
| 9,407,827 B2 | 8/2016 | Cao et al. |
| 9,413,972 B2 | 8/2016 | Shabtay et al. |
| 9,538,152 B2 | 1/2017 | Shabtay et al. |
| 9,568,712 B2 | 2/2017 | Dror et al. |
| 9,571,731 B2 | 2/2017 | Shabtay et al. |
| 9,596,411 B2 | 3/2017 | Thivent et al. |
| 9,599,796 B2 | 3/2017 | Shabtay et al. |
| 9,661,233 B2 | 5/2017 | Shabtay et al. |
| 9,674,439 B1 | 6/2017 | Mihic et al. |
| 9,743,001 B1 | 8/2017 | Stec |
| 9,774,798 B1 | 9/2017 | Evans et al. |
| 9,829,684 B2 | 11/2017 | Shabtay et al. |
| 9,857,568 B2 | 1/2018 | Dror et al. |
| 9,876,952 B2 | 1/2018 | Shabtay et al. |
| 9,888,179 B1 | 2/2018 | Liang et al. |
| 9,927,600 B2 | 3/2018 | Goldenberg et al. |
| 9,934,612 B2 | 4/2018 | Meier et al. |
| 9,953,217 B2 | 4/2018 | Feris et al. |
| 9,998,653 B2 | 6/2018 | Shabtay et al. |
| 9,998,659 B2 | 6/2018 | Bassi |
| 10,015,384 B2 | 7/2018 | Bachar et al. |
| 10,015,408 B2 | 7/2018 | Shabtay et al. |
| 10,027,893 B2 | 7/2018 | Bell et al. |
| 10,036,895 B2 | 7/2018 | Avivi et al. |
| 10,070,060 B2 | 9/2018 | Goldenberg et al. |
| 10,084,953 B1 | 9/2018 | Shabtay et al. |
| 10,126,633 B2 | 11/2018 | Avivi et al. |
| 10,156,706 B2 | 12/2018 | Shabtay et al. |
| 10,171,738 B1 | 1/2019 | Liang et al. |
| 10,194,089 B2 | 1/2019 | Nash et al. |
| 10,225,479 B2 | 3/2019 | Shabtay et al. |
| 10,250,797 B2 | 4/2019 | Shabtay et al. |
| 10,230,898 B2 | 5/2019 | Cohen et al. |
| 10,284,780 B2 | 5/2019 | Goldenberg et al. |
| 10,288,840 B2 | 5/2019 | Shabtay et al. |
| 10,288,896 B2 | 5/2019 | Shabtay et al. |
| 10,288,897 B2 | 5/2019 | Bachar et al. |
| 10,310,079 B1 | 6/2019 | Um et al. |
| 10,317,647 B2 | 6/2019 | Dror et al. |
| 10,324,277 B2 | 6/2019 | Dror et al. |
| 10,326,942 B2 | 6/2019 | Shabtay et al. |
| 10,330,897 B2 | 6/2019 | Dror et al. |
| 10,356,332 B2 | 7/2019 | Cohen et al. |
| 10,371,928 B2 | 8/2019 | Goldenberg et al. |
| 10,372,022 B2 | 8/2019 | Avivi et al. |
| 10,379,371 B2 | 8/2019 | Avivi et al. |
| 10,437,020 B2 | 10/2019 | Dror et al. |
| 10,459,205 B2 | 10/2019 | Goldenberg et al. |
| 10,462,370 B2 | 10/2019 | Shi et al. |
| 10,462,379 B2 | 10/2019 | Zhou et al. |
| 10,469,735 B2 | 11/2019 | Shabtay et al. |
| 10,488,630 B2 | 11/2019 | Dror et al. |
| 10,488,631 B2 | 11/2019 | Bacher et al. |
| 10,498,961 B2 | 12/2019 | Goldenberg et al. |
| 10,509,209 B2 | 12/2019 | Shabtay et al. |
| 10,534,153 B2 | 1/2020 | Shabtay et al. |
| 10,540,806 B2 | 1/2020 | Yang et al. |
| 10,558,058 B2 | 2/2020 | Bacher et al. |
| 10,567,666 B2 | 2/2020 | Cohen et al. |
| 10,571,644 B2 | 2/2020 | Shabtay et al. |
| 10,571,665 B2 | 2/2020 | Shabtay et al. |
| 10,571,666 B2 | 2/2020 | Goldenberg et al. |
| 10,578,948 B2 | 3/2020 | Shabtay et al. |
| 10,613,303 B2 | 4/2020 | Goldenberg et al. |
| 10,616,484 B2 | 4/2020 | Cohen et al. |
| 10,620,450 B2 | 4/2020 | Shabtay et al. |
| 10,645,286 B2 | 5/2020 | Fridman et al. |
| 10,656,396 B1 | 5/2020 | Goldenberg et al. |
| 10,670,827 B2 | 6/2020 | Shabtay et al. |
| 10,670,879 B2 | 6/2020 | Goldenberg et al. |
| 10,678,029 B1 | 6/2020 | Goldenberg et al. |
| 10,726,579 B1 | 7/2020 | Huang |
| 10,812,717 B2 | 10/2020 | Liang et al. |
| 11,064,119 B2 | 7/2021 | Shi et al. |
| 1,190,689 A1 | 11/2021 | Wang et al. |
| 11,227,146 B2 | 1/2022 | Liang et al. |
| 11,683,586 B2 * | 6/2023 | Shi ............... G06T 5/73 348/208.1 |
| 2002/0126883 A1 | 9/2002 | Senior |
| 2003/0038927 A1 | 2/2003 | Alden |
| 2004/0036844 A1 | 2/2004 | Wood et al. |
| 2008/0154908 A1 | 6/2008 | Datar et al. |
| 2008/0174822 A1 | 7/2008 | Kaimi et al. |
| 2009/0207266 A1 | 8/2009 | Yoda |
| 2009/0303343 A1 | 12/2009 | Drimbarean et al. |
| 2010/0149369 A1 | 6/2010 | Yasuda |
| 2010/0201709 A1 | 8/2010 | Yang et al. |
| 2011/0007175 A1 | 1/2011 | Fujita et al. |
| 2011/0085049 A1 | 4/2011 | Dolgin et al. |
| 2011/0090303 A1 | 4/2011 | Wu et al. |
| 2011/0141219 A1 | 6/2011 | Yeh |
| 2011/0234825 A1 | 9/2011 | Liu et al. |
| 2012/0050570 A1 | 3/2012 | Jasinski et al. |
| 2012/0218456 A1 | 8/2012 | Sweet et al. |
| 2013/0094724 A1 | 4/2013 | Al-Zahrani et al. |
| 2013/0121597 A1 | 5/2013 | Hsu |
| 2013/0147923 A1 | 6/2013 | Zhou et al. |
| 2013/0242129 A1 | 9/2013 | Harmelling et al. |
| 2013/0342731 A1 | 12/2013 | Lee et al. |
| 2014/0049658 A1 * | 2/2014 | Yamazaki .......... H04N 23/6812 348/208.11 |
| 2014/0126780 A1 | 5/2014 | Wang |
| 2014/0160309 A1 | 6/2014 | Karpenko |
| 2014/0313374 A1 | 10/2014 | Cao et al. |
| 2014/0368606 A1 | 12/2014 | Bassi |
| 2014/0369555 A1 | 12/2014 | Zhong et al. |
| 2015/0350548 A1 | 12/2015 | Beysserie et al. |
| 2015/0350550 A1 | 12/2015 | Thivent et al. |
| 2015/0362989 A1 | 12/2015 | Tyagi et al. |
| 2016/0004904 A1 | 1/2016 | Senechal et al. |
| 2016/0006935 A1 | 1/2016 | Zhou et al. |

(56) References Cited

U.S. PATENT DOCUMENTS

| | | | |
|---|---|---|---|
| 2016/0112637 A1 | 4/2016 | Aroia et al. | |
| 2016/0132715 A1 | 5/2016 | Feng et al. | |
| 2016/0309065 A1 | 10/2016 | Karafin et al. | |
| 2016/0337589 A1 | 11/2016 | Beysserie et al. | |
| 2016/0360111 A1 | 12/2016 | Thivent et al. | |
| 2017/0078576 A1 | 3/2017 | Ryu et al. | |
| 2017/0111584 A1 | 4/2017 | Hong et al. | |
| 2017/0213112 A1 | 7/2017 | Sachs et al. | |
| 2017/0244881 A1* | 8/2017 | Stec | H04N 23/687 |
| 2017/0272656 A1 | 9/2017 | Kurata | |
| 2017/0287221 A1 | 10/2017 | Ghaly et al. | |
| 2017/0351932 A1 | 12/2017 | Uliyar et al. | |
| 2017/0357873 A1 | 12/2017 | Roimela et al. | |
| 2018/0027262 A1 | 1/2018 | Reinhard et al. | |
| 2018/0048825 A1 | 2/2018 | Wang | |
| 2018/0176483 A1 | 6/2018 | Knorr et al. | |
| 2018/0181196 A1 | 6/2018 | Lee et al. | |
| 2018/0220101 A1 | 8/2018 | Evans et al. | |
| 2018/0240265 A1 | 8/2018 | Yang et al. | |
| 2018/0260614 A1 | 9/2018 | Wang et al. | |
| 2018/0348867 A1 | 12/2018 | Mujibiya | |
| 2019/0087007 A1 | 3/2019 | Weber et al. | |
| 2019/0104255 A1 | 4/2019 | Shi et al. | |
| 2019/0259360 A1 | 8/2019 | Yoelin | |
| 2019/0342497 A1 | 11/2019 | Liang et al. | |
| 2020/0007770 A1 | 1/2020 | Shi et al. | |
| 2020/0105291 A1 | 4/2020 | Sheaffer et al. | |
| 2020/0160046 A1 | 5/2020 | Andreou et al. | |
| 2020/0236466 A1 | 7/2020 | Zhao et al. | |
| 2020/0265211 A1 | 8/2020 | Nasrabadi et al. | |
| 2020/0374460 A1 | 11/2020 | Liang et al. | |
| 2021/0104208 A1 | 4/2021 | Goodsitt et al. | |
| 2021/0117076 A1 | 4/2021 | Conn et al. | |
| 2022/0053133 A1 | 2/2022 | Wang et al. | |
| 2022/0075991 A1 | 3/2022 | Liang et al. | |
| 2022/0180723 A1 | 6/2022 | Cheng et al. | |

FOREIGN PATENT DOCUMENTS

| | | |
|---|---|---|
| CN | 104079819 | 10/2014 |
| CN | 104769934 | 7/2015 |
| CN | 105306804 | 2/2016 |
| CN | 106954024 | 7/2017 |
| CN | 111738230 | 10/2020 |
| EP | 2219364 | 8/2010 |
| EP | 3167417 | 2/2020 |
| JP | 201485452 | 5/2014 |
| JP | 2016118701 | 6/2016 |
| KR | 20040077240 | 9/2004 |
| TW | 202034210 | 9/2020 |
| WO | 2008/114264 | 9/2008 |
| WO | 2014/005783 | 1/2014 |
| WO | 2015/198478 | 12/2015 |
| WO | 2018/005073 | 1/2018 |
| WO | 2019070333 | 4/2019 |
| WO | 2022026126 | 2/2022 |

OTHER PUBLICATIONS

Albrecht, et al., "Omnidirectional Video Stabilization on a Virtual Camera Using Sensor Fusion", 11th International Conference Control, Automation, Robotics and Vision, Dec. 2010, 7 pages.

Ali et al., "Fine-grained Vibration Based Sensing Using a Smartphone," arXiv:2007.03874v2, Aug. 27, 2020, 14 pages.

"AudioCapture-Premium Audio Experience for Your Video Recordings," Retrieved at: https://product.goodix.com/en/ product/audioa_capture—on Mar. 2008, 2 pages.

Baker et al., "Removing Rolling Shutter Wobble," Proceedings of the IEEE Conference on Computer Vision and Pattern Recognition, Jun. 2010, 8 pages.

Barrett, Brian, "Microsoft Hyperlapse Smooths Out Android Phone Shaky Cams," retrieved from https://www.wired.com/2015/05/microsoflhyperlapse/, May 15, 2015, 11 Pages.

Bell et al., "A Non-Linear Filter for Gyroscope-Based Video Stabilization," Springer; Stanford University; NVIDIA Research, 2014, 15 pages.

"Central Cylindrical Projection," retrieved from https://en.wikipedia.org/w/index.php?itle=Central_cylindrical_projection&oldid=919200175, Obtained per link provided in Defensive Publication published Jun. 8, 2020, Oct. 2, 2019, 2 pages.

Chang et al., "Low-light Image Restoration with Short-and-long-exposure Raw Pairs," arXiv:2007.00199v1 Jul. 1, 2020, 12 pages.

Chinese National Intellectual Property Administration, First Office Action mailed Jul. 21, 2022, Issued in connection with Chinese Patent Application No. 20210599340.0, 23 pages.

Chinese National Intellectual Property Administration, Office Action mailed Dec. 31, 2021, Issued in connection with Chinese Patent Application No. 201880030074.6, 8 pages.

Cho et al., "CMOS Digital Image Stabilization," IEEE Transactions on Consumer Electronics, IEEE Service Center, New York, NY, US, Aug. 1, 2017, 8 pages, vol. 53, No. 3.

Cho et al., "Vibration-based Surface Recognition for Smartphones," 2012 IEEE International Conference on Embedded and Real-Time Computing Systems and Applications, 2012, pp. 459-464.

Crawford et al., "Gradient Based Dominant Motion Estimation with Integral Projections for Real Time Video Stabilisation," 2004 International Conference on Image Processing (ICIP), Oct. 2004, 4 pages, vol. 5.

Dabove et al., "Inertial sensors for smartphones navigation," retrieved from https://springerplus.springeropen.com/articles/10.1186/s40064-015-1572-8, Dec. 30, 2015, 13 Pages.

"EIS: a No. trade-off user experience," retrieved from https://www.fotonation.com/products/digital-aperture/electronic-imagestabilization—on Oct. 13, 2017, 4 pages.

European Patent Office, Office Action mailed on Sep. 21, 2020, issued in connection with European Patent Application No. 18762179.2, 5 pages.

European Patent Office, Office Action mailed on May 27, 2021, issued in connection with European Patent Application No. 18762179.2, 4 pages.

Forbes, Dennis, "Optical vs. Electronic Image Stabilization," retrieved from https://dennisforbes.ca/index.php/2016/10/27 /optical-vs-electronicimage-stabilization/, Oct. 27, 2016, 14 pages.

Forbes, Dennis, "The Poorly Timed Insanity of Android," retrieved from https://dennisforbes.ca/index.php/2015/03/30/the-poorlv-timedinsanity-of-android, Mar. 30, 2015, 7 pages.

Fu, Biyang, "Sensor Applications for Human Activity Recognition in Smart Environments," Dissertation, https://diglib.eg.org/handle/10.2312/2633019, Sep. 24, 2020, 244 pages.

"Gallus: Video. Refined.", retrieved from https://www.yafla.com/gallus/, Jun. 16, 2017, 17 pages.

Ghafoor et al., "Fingerprint Frequency Normalisation and Enhancement Using Two-dimensional Short-lime Fourier Transform Analysis," Jul. 4, 2016, 32 pages.

Grundman et al., "Video Stabilization on YouTube," Google Research Blog, May 4, 2012 [retrieved on Oct. 13, 2015]. Retrieved from the Internet:URL<http://googleresearch.blogspot.de/2012/05/video-stabilization-onyoutube.html>, 7 pages.

Grundmann et al., "Auto-directed Video Stabilization with Robust L Optimal Camera Paths," IEEE Explore, Jun. 20, 2011, 8 pages.

Gupta, Aman "Techniques for Automatically Determining a Time-Lapse Frame Rate", Technical Disclosure Commons, Retrieved from https://www.tdcommons.org/dpubs_series/3237, May 15, 2020, 11 pages.

Hartley et al., "Multiple View Geometry in Computer Vision, Second Edition," Cambridge University Press, 2003, pp. 99-112.

Hong et al., "Image Deblurring According to Facially Recognized Locations Within the Image", Technical Disclosure Commons, https://www.tdcommons.org/dpubs_series/4193, Mar. 26, 2021, 9 pages.

"Homography (computer vision)," Retrieved from the Internet: URL<https://en.wikipedia.org/wiki/Homography (computer vision); retrieved on Apr. 9, 2020, 9 pages.

"How ZeroShake works," retrieved from http://www.zeroshake.com/indepth/how-it-works/—Oct. 13, 2017, 3 Pages.

(56) References Cited

OTHER PUBLICATIONS

Huang, Sianyi, "Localized Brightness Adjustment Method," Technical Disclosure Commons, Dec. 26, 2021, 11 pages.
Huth et al., "Significantly Improved Precision of Cell Migration Analysis in Time-Lapse Video Microscopy Through Use of a Fully Automated Tracking System," BMC Cell Biology 2010, 11:24, http://www.biomedcentral.com/1471-2121/11/24, 2010, 12 pages.
"Image Stabilization," From Wikipedia, the free encyclopedia, last modified on Sep. 28, 2015 [retrieved on Oct. 13, 2015]. Retrieved from the Internet: URL<https://en.wikipedia.org/wiki/Image stabilization#/Optical image stabilization, 4 pages.
"Image stabilization," Retrieved from https://en.wikipedia.org/wiki/Image_stabilization, Last updated on Aug. 24, 2017, 7 pages.
"Inertial Measurement Unit," retrieved from https://en.wikipedia.org/wiki/Inertial_measurement_unit—Last updated on Sep. 28, 2017, 3 pages.
"Infinite Impulse Response," From Wikipedia, the free encyclopedia, last modified on Sep. 7, 2015 [retrieved on Oct. 13, 2015]. Retrieved from the Internet: URL<https://en.wikipedia.org/wiki/Infinite_impulse_response, 4 pages.
Intellectual Property India, Office Action mailed on Oct. 7, 2021, issued in connection with Indian Patent Application No. 201947044582, Oct. 7, 2021, 8 pages.
International Bureau, International Preliminary Report on Patentability mailed on Apr. 8, 2020, issued in connection with International Patent Application No. PCT/US2018/044524, 8 pages.
International Bureau, International Preliminary Report on Patentability mailed on Nov. 19, 2020, issued in connection with International Patent Application No. PCT/US2019/027934, 9 pages.
International Bureau, International Preliminary Report on Patentability mailed on Apr. 26, 2018, issued in connection with International Patent Application No. PCT/US2016/053252, 9 pages.
International Searching Authority, International Search Report and Written Opinion mailed on Dec. 23, 2016, issued in connection with International Patent Application No. PCT/US2016/053252, 14 pages.
International Searching Authority, International Search Report and Written Opinion mailed on Jul. 8, 2019, issued in connection with International Patent Application No. PCT/US2019/027934, 16 pages.
International Searching Authority, International Search Report and Written Opinion mailed on Oct. 24, 2018, issued in connection with International Patent Application No. PCT/US2018/044524, 16 pages.
International Searching Authority, International Search Report and Written Opinion mailed on Oct. 7, 2021, issued in connection with International Patent Application No. PCT/US2021/040378, 16 pages.
Jackson, Ian, "The Creative and Technical Differences Between Full Frame and S-35," Accessed from: https://vmi.tv/training/usefulstuff/differences-between-full-frame-and-s-35, Feb. 2020, 19 pages.
Japan Paten Office, Notice of Allowance mailed Nov. 27, 2020, issued in connection with Japanese Patent Application No. 2019562259, 6 pages.
Kao et al., "An Overview of Image / Video Stabilization Techniques," Single-Sensor Imaging Methods and Applications for Digital Cameras, CRC Press, Boca Raton, Florida, Dec. 31, 2018, 27 pages.
Kao et al., "An Overview of Image/Video Stabilization Techniques", CRC Press, Jan. 2008, 28 pages.
Karpenko al., "Digital Video Stabilization and Rolling Shutter Correction using Gyroscopes", Retrieved from https://graphics.stanford.edu/papers/stabilization/, Mar. 2011, 7 pages.
Karpenko al., "Digital Video Stabilization and Rolling Shutter Correction using Gyroscopes," Stanford Tech Report CTSR, Mar. 2011, 7 pages.
Kerzel et al., "Haptic Material Classification with a Multi-Channel Neural Network," International Joint Conference on Neural Networks (IJCNN), May 2017, pp. 439-446.
Koppel et al., "Robust and Real-Time Image Stabilization and Rectification," Application of Computer Vision, 2005, WACV/MOTIONS '05 Volume 1, Seventh IEEE Workshops, Jan. 2005, 6 pages.

Lavry, Dan, "Understanding IIR (Infinite Impulse Response) Filters—An Intuitive Approach", Lavry Engineering, 1997, 5 pages.
Li et al., "Scene-Aware Audio for 360° Videos," arXiv:1805.04792v1, May 12, 2018, 12 pages.
Liang et al., United States Patent and Trademark Office, Non-Final Office Action mailed Oct. 3, 2019, issued in connection with U.S. Appl. No. 16/235,037, filed Dec. 28, 2018, 6 pages.
Liang et al., United States Patent and Trademark Office, Notice of Allowance mailed Mar. 26, 2020, issued in connection with U.S. Appl. No. 16/235,037, filed Dec. 28, 2018, 8 pages.
Liang et al., United States Patent and Trademark Office, Notice of Allowance mailed Aug. 29, 2018, ssued in connection with U.S. Appl. No. 15/972,044, filed May 4, 2018, 8 pages.
Liang et al., United States Patent and Trademark Office, Notice of Allowance mailed Jun. 8, 2020, issued in connection with U.S. Appl. No. 16/235,037, filed Dec. 28, 2018, 8 pages.
Liang et al., United States Patent and Trademark Office, Non-Final Office Action mailed on Sep. 14, 2022, Issued in connection with U.S. Appl. No. 17/529,808, filed Nov. 18, 2021, 18 pages.
Liang et al., United States Patent and Trademark Office, Notice of Allowance mailed Sep. 1, 2021, issued in connection with U.S. Appl. No. 16/989,566, filed Aug. 10, 2020, 11 pages.
Liang et al., United States Patent and Trademark Office, Observations by at least some of the inventors, filed on May 14, 2018, issued in connection with U.S. Appl. No. 15/972,044, filed May 4, 2018, 1 page.
Liu et al., "Bundled camera paths for video stabilization," ACM Transactions on Graphics, Jul. 11, 2013, 10 pages, vol. 32.
Ma et al., "Video Stabilization and Face Saliency-based Retargeting," Stanford Course, Oct. 1, 2016, 7 pages.
Ma et al., "Video Stabilization and Face Saliency-based Retargeting," [retrieved on May 15, 2018] Retrieved from Internet: URL<https://pdfs.semanticscholar.org/9b07 /27 | 3e678bd4b80d92e7fl 47ad87b2ec2f22c.pdf?_ga=2. 15583 2 379.1079424380.1526408964-2141874779.1512576219>, 2016, 7 pages.
"Mercator Projection," retrieved from https://en.wikipedia.org/w/index.php?title=Mercator_projection&oldid=955134599, Obtained per link provided in Defensive Publication published Jun. 8, 2020, 2020, 15 pages.
Miller, Ross, "Hyperlapse's secret best feature: fixing your shaky hands," retrieved from https://www .theverge.com/2014/10/13/6968699/hyperlapse-is-reallygood-at-stabilized-video, Oct. 13, 2014, 5 pages.
Mourcou et al., "Performance Evaluation of Smartphone Inertial Sensors Measurement for Range of Motion," retrieved from mdpi.com/journals/sensors vol. 15, Issue 9, Sep. 15, 2015, 20 pages.
Mustaniemi et al., "LSD—Joint Denoising and Deblurring of Short and Long Exposure Images with CNNs," arXiv:1811.09485v3, Sep. 1, 2020, 21 pages.
Nadig, Sachin, "Techniques for Detecting and Classifying User Behavior Through the Fusion of Ultrasonic Proximity Data and Doppler-Shill Velocity Data", Technical Disclosure Commons, Nov. 4, 2022, 9 pages.
Nirmal et al., "Deep Learning for Radio-based Human Sensing: Recent Advances and Future Directions," IEEE Communications Surveys & Tutorials, Feb. 7, 2021, 29 pages.
"Nokia OZO Audio," OZO.Nokia.com—Retrieved on Feb. 10, 2021, 2020, 16 pages.
"Optical Image Stabilization (OIS)," retrieved from https://www.rohm.com/documents/11303/41217/0IS-white-paper.pdf—on Oct. 12, 2017, Copyright 2013, 13 pages.
Oth et al., "Rolling Shutter Camera Calibration," retrieved from https://ieeexplore.ieee.org/document/6619023, 2013, 8 Pages.
Rawat et al., "Review of Motion Estimation and Video Stabilization Techniques for Handheld Mobile Video," Signal & Image Processing: An International Journal (SIPIJ), Jun. 2011, 12 pages.
Roth, Gerhard, "Homography", ECCD, COMP 4900, Class Note, Fall 2009, 22 pages.
Sammoura, et al., "Random Sample Consensus Algorithm with Enhanced Latency for Fingerprint Matching," Technical Disclosure Commons, https://www.ldcommons.org/dpubs_series/5451, Nov. 4, 2022, 14 pages.

(56) References Cited

OTHER PUBLICATIONS

Shi et al., "Steadiface: Real-Time Face-Centric Stabilization On Mobile Phones," IEEE International Conference on Image Processing (ICIP), Taipei, Taiwan, May 3, 2019, pp. 4599-4603.

Shi et al., United States Patent and Trademark Office, Non-Final Office Action mailed Oct. 5, 2018, issued in connection with U.S. Appl. No. 15/724,241, filed Oct. 3, 2017, 10 pages.

Shi et al., United States Patent and Trademark Office, Notice of Allowance mailed Apr. 14, 2021, issued in connection with U.S. Appl. No. 16/568,931, filed Sep. 12, 2019, 8 pages.

Shi et al., United States Patent and Trademark Office, Notice of Allowance mailed Jun. 14, 2019, issued in connection with U.S. Appl. No. 15/724,241, filed Oct. 3, 2017, 14 pages.

Shi et al., United States Patent and Trademark Office, Corrected Notice of Allowability mailed Jun. 18, 2021, issued in connection with U.S. Appl. No. 16/568,931, filed Sep. 12, 2019, 4 pages.

Shi et al., United States Patent and Trademark Office, Non-Final Office Action mailed Oct. 3, 2019, issued in connection with U.S. Appl. No. 16/568,931, filed Sep. 12, 2019, 35 pages.

Shih et al., "Techniques for Deblurring Faces in Images by Utilizing Multi- Camera Fusion," Technical Disclosure Commons—https://www.tdcommons.org/dpubs_series/4274, May 5, 2021, 9 pages.

Shih et al., "Techniques for Wide-Angle Distortion Correction Using an Ellipsoidal Projection," Technical Disclosure Commons; Retrieved from https://www.tdcommons.org/dpubs_series/3299, Jun. 8, 2020, 9 pages.

Shih et al., "Distortion-Free Wide-Angle Portraits on Camera Phones," ACM Transactions on Graphics, Retrieved from https://doi.org/10.1145/3306346.3322948, Jul. 2019, 12 pages, vol. 38, No. 4, Article 61.

Shin, D., "Utilizing Haptics Vibrations to Determine Spatial Context," Technical Disclosure Commons, https://www.dcommons.org/dpubs_series/5474, Nov. 4, 2022, 8 pages.

"Smooth Camera Transition—Continuous and Smooth Zoom for Images and Videos," retrieved from https://corephotonics.com/inventions/smoothcamera-transition/ on Apr. 17, 2020; Core Photonics, Dec. 16, 2019, 5 pages.

"SteadXP—Video stabilization made simple," retrieved from https://www.kickstarter.com/projects/1091165875/steadxp-the-future-ofvideo-stabilization—on Oct. 13, 2017, Last updated Jul. 2, 2017, 26 pages.

"Stereographic Projection," retrieved from https://en.wikipedia.org/w/index.php?title=Stereographic_projection&oldid=954632592, Obtained per link provided in Defensive Publication published Jun. 8, 2020, May 28, 2020, 16 pages.

Talvala et al., "Techniques and Apparatuses for Variable-Display Devices to Capture Screen-Fitting Images with a Maximized Field of View," Technical Disclosure Commons; Retrieved from https://www.tdcommons.org/dpubs_series/3388, Jun. 29, 2020, 8 pages.

Tian et al., "Globally Optimal Estimation of Nonrigid Image Distortion," International journal of computer vision, Jul. 2012, 27 pages, vol. 98. No. 3.

Unknown Author, "The Homography Transformation," CorrMap, 2013 [retrieved on Oct. 13, 2015]. Retrieved from the Internet: URL<http://www.corrmap.com/features/homographytransformation.php>, 5 pages.

Vanhemert, Kyle "Killer Software that Finally Stabilizes Shaky Gopro Videos," www.wired.com; Retrieved from Internet: URL<https://www.wired.com/2014/08/killer-software-that-finallystabilizes-shaky-gopro-videos/, Aug. 14, 2014, 9 pages.

Wang et al., United States Patent and Trademark Office, Non-Final Office Action mailed May 3, 2021, issued in connection with U.S. Appl. No. 16/941,775, filed Jul. 29, 2020, 4 pages.

Wang et al., United States Patent and Trademark Office, Notice of Allowance mailed Jul. 26, 2021, issued in connection with U.S. Appl. No. 16/941,775, filed Jul. 29, 2020, 5 pages.

Wei et al., "Relative Pose Estimation Algorithm with Gyroscope Sensor," Journal of Sensors, Oct. 27, 2016, 9 pages, vol. 2016, Article ID 8923587.

Wilkie, Oliver, "Motion stabilisation for video sequences," Imperial College London, Department of Computing, MEng Final Year Project, Jun. 18, 2003, 63 pages.

Yalanska, Marina, "UX Design: How to Make User Interface Readable," Tubik Blog, Accessed online at: https://blog.tubikstudio.com/ux-:lesign-readable-user-interface/ on Oct. 5, 2021, 24 pages.

Yang et al., "Improved Object Detection in an Image by Correcting Regions with Distortion," Technical Disclosure Commons; Retrieved from https://www.tdcommons.org/dpubs_series/3090, Apr. 1, 2020, 8 pages.

Yuan et al., "Image Deblurring with Blurred/Noisy Image Pairs," ACM Transactions on Graphics, Jul. 29, 2007, 10 pages, vol. 26, Issue 3.

Zhang, Michael, "Google Explains Why the Pixel Doesn't Have Optical Image Stabilization," retrieved from https://petapixel.com/2016/10/11/google-explains-pixel-doesnt-opticalimage-stabilization/, Oct. 11, 2016, 11 Pages.

* cited by examiner

VIDEO STABILIZATION

RELATED APPLICATIONS

This application is a continuation of U.S. application Ser. No. 17/336,194, filed Jun. 1, 2021, which is a continuation of U.S. application Ser. No. 16/568,931, filed Sep. 12, 2019, which is a continuation of U.S. application Ser. No. 15/724, 241, filed Oct. 3, 2017, which are incorporated herein by reference in their entireties.

BACKGROUND

Video recording is commonly performed using cameras, cellular telephones, tablet computers, and other recording devices. In many cases, videos recorded using handheld recording devices suffer from unintentional movement that reduces video quality. One of the major causes of movement is hand shake, e.g., when a user's unintentional or involuntary movements while holding the recording device affects a quality of the video. Inconsistent panning and other motions can also degrade video quality. These undesired motions can cause blur, shaking, and other visible flaws in recorded video footage.

Shaking of the recording device can result in an equally-shaky video unless that shaking is compensated, for example, by an image stabilization mechanism. Optical image stabilization (OIS) can decrease shaking and blur present in a video by mechanically moving components of the recording device, such as a lens or the image sensor. However, the operation of OIS systems can sometimes introduce artifacts, and OIS systems are generally limited in the amount of motion that they can compensate. Similarly, OIS systems may incorrectly compensate for intentional movements of a recording device, such as panning by the user. Electronic image stabilization (EIS) can also reduce shaking present in video, for example, by aligning and shifting image frames based on analysis of the images. However, not all EIS techniques are reliable, since processing can sometimes be confused by subject motion, noise, and camera motion blur in the captured video.

SUMMARY

A video stabilization system can stabilize video using a combination of OIS and EIS. An OIS module can stabilize frames during video capture, and position information (e.g., lens shift information) from the OIS module can captured and used in EIS processing. By using OIS lens shift positions, the stabilization processing can correct for distortion caused by the OIS system as well as avoid making adjustments or motion that was already compensated for by the OIS system.

During video capture, the system can also obtain position data for the recording device from a gyroscope of the recording device. The system can use the device position data and OIS position data during EIS processing to take into account the actual pose of the recording device during capture as well as adjustments to the camera view caused by OIS. As a result, the EIS processing can compensate for motion of the recording device as a whole (e.g., camera shake or other extrinsic movement of the recording device) as well as image shifts due to operation of the OIS module (e.g., internal lens movements). This can allow the system to more accurately determine relationships between the captured image data and the real-world scene, to more accurately generate a stabilized output frame from an input frame.

The video stabilization system can use various other techniques to provide high-quality stabilization. For example, when processing a frame, the system can use future frames (e.g., later-captured or look-ahead frames) to detect possible large motion and start compensating for it even before the large motion occurs. This can help avoid sudden motion changes in a series of frames. Even when performing stabilization in substantially real time with video capture, analysis of future frames can be performed by implementing a small delay between frame capture and EIS processing to allow an appropriate number of later-captured frames to become available for use in stabilizing earlier-captured frames. As another example, the system can correct for rolling shutter distortion by accounting for different camera positions when different regions of a frame are captured. Different image transforms can be applied for different regions of a captured frame, e.g., different scanlines, so that the stabilized output frame correctly aligns the different regions. As another example, the system can detect camera lens movement due to focus change, and can remove changes in perspective caused by the change in effective focal length that often accompanies focus change (e.g., focus breathing) As another example, the system can assess camera motion blur and align the motion path estimated using EIS with the movement indicated by the blur.

In one general aspect, a method includes: receiving, by a computing system, a series of frames of a video captured by a recording device using an optical image stabilization (OIS) system; receiving, by the computing system, (i) OIS position data indicating positions of the OIS system during capture of the series of frames, and (ii) device position data indicating positions of the recording device during capture of the series of frames; determining, by the computing system, a first transformation for a particular frame in the series of frames, the first transformation being determined based on the OIS position data for the particular frame and the device position data for the particular frame; determining, by the computing system, a second transformation for the particular frame based on the first transformation and positions of the recording device determined, based on the device position data, for one or more frames in the series of frames that are captured after the particular frame; and generating, by the computing system, a stabilized version of the particular frame using the second transformation.

Implementations can include one or more of the following features. For example, the recording device and the computing system may be integrated into a single device.

In some implementations, the computing system and the recording device are both parts of a mobile phone.

In some implementations, receiving the OIS position data comprises receiving lens shift data indicating positions of a movable lens of the OIS system, and receiving the device position data comprises receiving orientation or movement data from a gyroscope or an accelerometer of the recording device.

In some implementations, the OIS position data indicates multiple OIS position readings for each frame in the series of frames. The device position data indicates multiple device position measurements for each frame in the series of frames.

In some implementations, the method includes determining a lens focus position corresponding to the particular frame. The first transformation for the particular frame is determined using the lens focus position.

In some implementations, the method includes determining an image offset for the particular frame based on a position of a movable element of the OIS system as indicated by the OIS position data. The first transformation for the particular frame is determined using the image offset.

In some implementations, the method includes: determining a set of camera positions occurring over a set of multiple frames based on the OIS position data and device position data, the set of multiple frames including one or more frames before the particular frame and one or more frames after the particular frame; and applying a filter to the set of camera positions. The second transformation is determined based on a camera position determined based on applying the filter to the set of camera positions.

In some implementations, the method includes: determining an intermediate camera position for the particular frame from the output of applying the filter to the set of camera positions; and comparing the intermediate camera position with a virtual camera position for a frame immediately before the particular frame. The second transformation is determined based on a camera position determined based on the comparison of the intermediate camera position with the virtual camera position for the frame immediately before the particular frame.

In some implementations, the method includes generating data characterizing an amount of motion blur in the particular frame. The second transformation is determined based on a camera position determined using the data characterizing an amount of motion blur in the particular frame.

In some implementations, generating data characterizing motion blur in the particular frame comprises estimating a motion blur kernel based on a projection matrix that determined for a beginning of exposure of the particular frame and a projection matrix for an end of exposure of the particular frame.

In some implementations, the method includes determining a camera position representing a position occurring during consistent movement of the recording device over a set of multiple frames. The second transformation is determined based on the camera position representing a position occurring during consistent movement of the camera.

In some implementations, the camera position is generated by applying a stable filter to data corresponding to a set of frames that includes one or more one or more frames before the particular frame and one or more frames after the particular frame.

In some implementations, the method includes: determining a probability of consistent movement of the recording device based on analysis of camera positions over a set of frames that includes one or more frames before the particular frame and one or more frames after the particular frame; and blending (i) the camera position representing a position occurring during consistent movement of the camera with (ii) a second camera position for the particular frame, wherein the camera positions are blended according to the determined probability. The second transformation is determined based on a result of blending the camera position and the second camera position.

In some implementations, the probability of consistent movement is determined using a linear regression over a set of camera positions that is sub-sampled from camera positions corresponding to the set of frames. The second camera position is determined using data indicating an amount of blur in the particular frame.

In some implementations, determining the second transformation for the particular frame includes: determining, for each reference frame in a reference set including the particular frame and one or more frames occurring after the particular frame, a projection of image data of the frame based on the device position data and OIS position data corresponding to the frame; determining a transformation for the particular frame that maps the projected image data of the particular frame to an output frame; determining, for each reference frame in the reference set, whether the determined transformation for the particular frame defines each of the pixels of the output frame when applied to the reference frame; identifying at least one reference frame for which application of the determined transformation to the projected image data does not define each of the pixels of the output frame; identifying a minimal transition measure between a camera position determined for the particular frame and a camera position determined for the at least one reference frame; and determining the second transformation for a camera position determined using the identified minimal transition measure, the second transformation being determined such that the second transformation maps image data to each of the pixels of an output frame when applied to the projection of each of the reference frames in the reference set.

In some implementations, the method includes: determining a current transition measure for the particular frame, the current transition measure indicating a difference between a camera position determined for a frame immediately before the particular frame and a camera position determined for the particular frame; determining a future transition measure for each of one or more future frames occurring after the particular frame, wherein each future transition measure indicates a difference between a camera position determined for the particular frame and a camera position determined for one of the future frames; identifying, from among the current transition measure and the future transition measures, a largest transition measure indicating a largest difference in camera positions; and determining a camera position based on the identified largest transition measure. The second mathematical transform is determined using the determined camera position.

In some implementations, determining the camera position based on the identified largest transition measure includes: determining that the largest transition measure corresponds to a particular future frame of the one or more future frames; and adjusting a camera position for the particular frame toward the camera position for the particular future frame, where the camera position for the particular frame is adjusted in an amount that is scaled according to an amount of time between capture of the particular frame and capture of the particular future frame.

In some implementations, the method includes determining, for each of proper subset of scanlines of the particular frame, a mapping of the scanline with respect to the output frame or a virtual camera position for the scanline; and determining a mapping for each scanline of the particular frame by interpolating between the determined mappings for the proper subset of scanlines or interpolating between the determined virtual camera positions for the proper subset of scanlines.

In some implementations, the first transformation is a first projection matrix that maps the particular frame to an image, and the second transformation is a second projection matrix for projecting the image in the intermediate space to the stabilized version of the particular frame.

Other embodiments of these aspects include corresponding systems, apparatus, and computer programs, configured to perform the actions of the methods, encoded on non-transitory machine-readable storage devices. A system of one or more devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Various implementations may provide one or more of the following advantages. For example, the quality of video footage can be improved through the reduction of shake, blur, and other movement. By combining OIS techniques and EIS techniques, the stabilized video can be smoother than using either technique alone. OIS can significantly reduce the camera motion blur in individual frames, as well as reduce motion over multiple frames. EIS can further reduce motion apparent in a series of video frames, using data from gyroscope sensors that track movement of the recording device. The EIS processing can also use OIS position data, such as lens shift information, to increase accuracy in mapping image data to the stabilized output frame. The system can use the OIS position data and device gyroscope sensors together to estimate camera positions. This can allow the EIS processing to avoid correcting for device motion already counteracted by the OIS module, and also allow the EIS to correct for undesired OIS movements (e.g., movements that that interfere with panning, introduce distortion, or do not correspond to device motion).

In some implementations, the system can reduce the impact of large or sudden movements using look-ahead frames to increase the accuracy of EIS processing. Based on analysis of subsequent frames, video frames can be adjusted to gradually prepare for large changes in movement before the movement occurs. The system can evaluate whether consistent movement, such as panning, is occurring and adjust the video frames to reflect the consistent movement. Rolling shutter distortion can be reduced or eliminated. Changes in perspective due to focus breathing can be reduced or eliminated.

In some implementations, the system can provide real-time or substantially real-time processing while video is captured. For example, EIS processing can occur while video footage is being recorded, so that the recorded footage has the EIS processing applied. Further, the techniques discussed can be performed in a manner that is computationally feasible and power efficient on a battery-powered mobile electronic device, such as a mobile phone.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
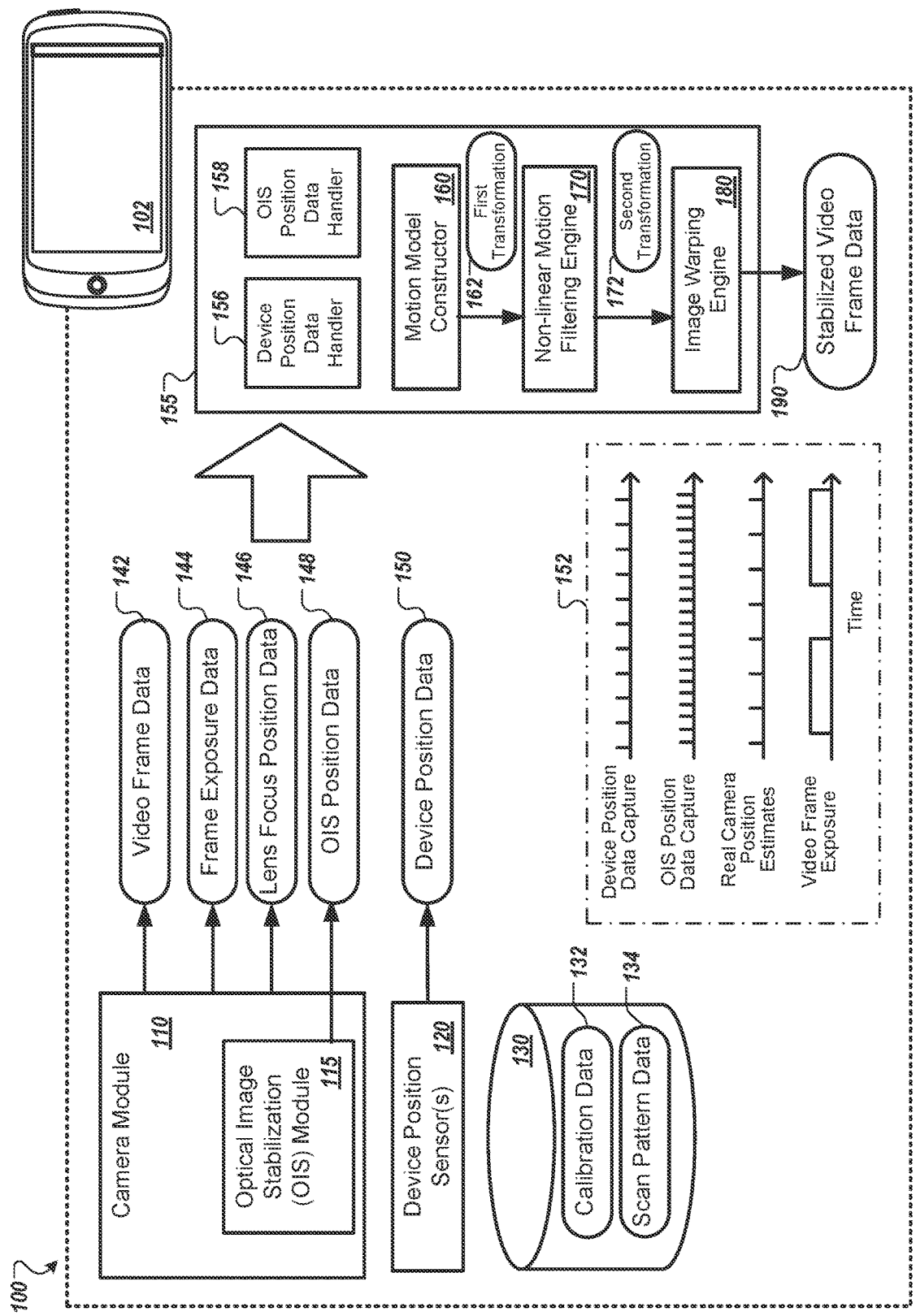
FIG. 1 is a diagram that illustrates an example of a system for video stabilization.

FIG. 1 is a diagram that illustrates an example of a system 100 for video stabilization. The system 100 includes a recording device 102 that includes a camera module 110 with an OIS module 115. The recording device 102 captures video frames while using the OIS module 115 to at least partially counteract movement of the recording device 102 during frame capture. The recording device 102 also includes one or more device position sensors 120, one or more data storage devices 130, and an EIS module 155.

The recording device 102 can be any of various types of that includes a camera module, such as a mobile phone, a tablet computer, a camera, etc. The recording device 102 can include a computing system for performing the operations of the EIS module 155, which may be carried out in software, hardware, or some combination thereof. For example, the recording device 102 may include various processing components, e.g., one or more processors, one or more data storage devices storing executable instructions, memory, input/output components, and so on. The processors that perform the EIS processing may include general purpose processors (e.g., the main CPU of a mobile phone or other device), a graphics processor, a co-processor, an image processor, a fixed-function EIS processor, or any combination thereof.

The EIS module 155 uses position data from both the device position sensors 120 and the OIS module 115 to stabilize the video captured by the recording device. For example, the position data from the OIS module 115 can be used to determine offsets, representing the effects of OIS movement, with respect to expected camera view that would be inferred from the device position data. This enables the EIS module 155 to estimate an effective camera position reflecting the actual view of the image sensor even as the OIS module 115 varies the camera's view of a scene relative to the device position. Along with other features discussed herein, these techniques can enable the recording device 102 to effectively use OIS and EIS processing concurrently and realize the benefits of both technologies.

In general, OIS can be very effective at reducing blur within individual frames due to camera shake, and OIS can be somewhat effective at reducing movement apparent over a series of frames. OIS used alone is often subject to various limitations, however. OIS modules may be limited in the speed that they respond to movement and in the magnitude of movement that can be compensated. In addition, the operation of OIS modules sometimes causes distortion such as wobbly video, and may incorrectly counteract desired movement such as panning. The EIS module 155 can lessen the impact of these limitations using the position data describing the internal movements of the OIS module.

Because the OIS module 115 attempts to compensate for movement of the recording device, device motion alone may not indicate the true camera view used during video capture. If EIS processing attempts to compensate for movement based on device motion alone, the EIS processing may attempt to correct for movement that was already compensated for by the OIS system. Further, OIS generally only partially removes the effects of device movements, and the amount of compensation can vary from one frame to the next. To provide high-quality stabilization, the EIS module 155 uses OIS position data alongside device-level position data to vary the amount of stabilization applied for each frame, and even for individual scanlines of frames in some implementations. This processing can provide effective stabilization as well as reduce or eliminate distortion in video footage. For example, changes in OIS lens shift position while capturing a frame may introduce distortion, especially when combined with rolling shutters that are typical of many camera modules. With information about the OIS lens shifts at different times during frame capture, the EIS module 155 can estimate the lens positions when different portions of the frame were captured and correct the image. The EIS module 155 can also compensate to reduce the impact of OIS lens shifts that interfere with panning or are otherwise undesired.

Another way that the EIS module 155 can enhance the video is through analysis of data for subsequently captured frames. To process a particular frame, the EIS processing module may assess a set of camera positions in a time window including times when one or more future frames were captured. The information regarding future frames and corresponding positions can be used in a number of ways. First, the EIS module 155 can apply filtering to the set of camera positions to smooth the motion pattern used to define image transforms for altering the frames. Second, the EIS module 155 can use the set of camera positions to evaluate a likelihood that consistent movement (e.g., panning) is present or is attempted and then adjust frames consistent with this motion when likely. Third, the EIS module 155 can evaluate the camera position for a frame with respect to future camera positions and adjust for large future movements. For example, if a large, rapid movement is identified for future frames, the EIS module 155 can begin adjusting the content of frames before the motion begins. Rather than allowing a large apparent motion over a few frames, the EIS module 155 can spread the motion over larger frames, so that incremental image shifts occur during earlier frames and gradually spread out the movement over a greater number of frames.

The EIS module 155 performs regional synthesis of the output frames, for example, varying the transforms applied to each scanline of an image frame. This allows the system to correct for rolling shutter distortion, movement of the OIS module 115, and various device motions that occur within the capture duration for a single frame.

Referring still to FIG. 1, the recording device 102 can be any appropriate device having a camera to capture video data, e.g., a camera, a cellular phone, a smart phone, a tablet computer, a wearable computer, or other device. While the example of FIG. 1 illustrates a single device capturing video and processing the video, the functions may optionally be spread among multiple devices or systems. For example, a first device may capture video frames and also record position data and other parameters as metadata. The first device may provide the video frames and metadata to a second device, e.g., a local computing system or a remote server, which can perform EIS processing as discussed herein.

The camera module 110, can include a lens elements, an image sensor, sensor read circuitry, and other components. The OIS module 115 can include sensors, a movable element, a processor, and a drive mechanism to move the movable element. The movable element is located in the optical path of the camera module 110. For example, the movable element may be reflective or refractive element, for example, a lens, a mirror, a prism. In some implementations, the movable element is the image sensor of the camera module 110. The sensors can include one or more gyroscopes or other sensors to detect movement. The processor determines an amount and direction of movement needed for the movable element to compensate for movement indicated by the sensors, then instructs the drive mechanism to move the movable element.

The recording device 102 includes one or more position sensors 120 that that measure changes in the orientation of the recording device 102. In some implementations, the position sensors 120 for the recording device 102 are separate from the sensors used by the OIS module 115. The position sensors 120 can detect rotation of the recording device 102 about one or more axes. As examples, the device position sensor 120 may be a 3-axis gyroscope or an inertial measurement unit (IMU). Other sensors may additionally or alternatively be used to determine device position. For example, one or more accelerometers, one-axis gyroscopes, two-axis gyroscopes, etc. may be used to determine a position of the recording device 102. Generally, any appropriate sensor or combination of sensors that allow a rotational position of the recording device 102 to be determined can be used.

In some instances, position data from gyroscope sensors of the OIS module 115 may be captured and stored in addition to or instead of using separate position sensors 120 of the recording device 102. Nevertheless, it can be beneficial for the recording device 102 to use gyroscope sensors that have different characteristics than OIS sensors. For example, gyroscope sensors in for the recording device 102 may provide measurements at a rate of about 400 Hz with sensible rotation range of greater than 100 degrees per second. Compared to device-level sensors, typical gyroscope sensors of OIS modules may provide measurements at a different rate and range, e.g., a rate of 5000 measurements per second or higher, with a sensible rotation range of about 10 degrees per second. In some implementations, having the greater sensible rotation range of device-level sensors is beneficial (e.g., to describe large movements), as is the more frequent measurements of OIS module sensors (e.g., to detect small changes or high-frequency patterns). Both types of data may thus be used together to determine positions of the recording device 102.

The recording device 102 includes one or more data storage devices 130 which store information characterizing the camera module 110 and the frame capture process. For example, the stored data can include calibration data 132 that indicates relationships between positions of the OIS module 115 and resulting offsets occurring in image data. Similarly, the calibration data 132 can indicate a correspondence of camera module lens focus positions and effective focal lengths for those focus positions, allowing the system to account for focus breathing. The stored data can include scan pattern data 134, which can indicate readout properties of the image sensor in the camera module 110. For example, the scan pattern data 134 may indicate, for example, a direction of scanning (e.g., scanlines read from top to bottom), whether scanlines are read individually or in groups, and so on.

During video capture, the camera module 110, the OIS module 115, and the device position sensor 120 me each provide information about the video capture process. The camera module 110 provides video frame data 142, for example, a sequence of video image frames. The camera module 110 also provides frame exposure data 144, which can include, for each frame captured, an indication of an exposure duration and a reference time indicating when the exposure occurred (e.g., a start time or end time for the exposure). The camera module 110 also provides lens focus position data 146, which indicates a lens focus position for each captured frame.

The OIS module 115 provides OIS position data 148, which indicates the position of the movable element of the OIS module 115 at various times during video capture. For example, when the movable element is a movable lens that shifts to compensate for motion, the OIS module 115 can provide a lens shift read out that specifies the current position of the movable lens. The recording device 102 can record the lens shift position and time that the position occurred. In some implementations, the OIS position data 148 is captured at a high frequency, for example at a rate that is higher than the frame rate of video capture, so that multiple measurements are made over the duration of each video frame exposure.

The device position sensors 120 provide device position data 150 that indicates rotation and/or other movement of the recording device 102 during video capture. The device position can be measured at a high frequency, for example, 200 Hz or higher. Thus, in many instances, measurements can be obtained for multiple different times during the capture of each video frame.

The lens focus position data 146, the OIS position data 148, and the device position data 150 can all be recorded with timestamps indicating times that the specified positions occurred. The timestamps can be made with precision, for example, to the nearest millisecond, so that the data obtained from the various position measurements can be aligned in time. In addition, positions of a device, OIS system, or lens focus mechanism can be interpolated to determine values at times between measurements.

An example of potential timing of data capture is shown in chart 152. As illustrated, device position data 150 (e.g., gyroscope data) and OIS position data 148 (e.g., lens shift position data) may be captured at rates higher than the video capture frame rate (e.g., 30 frames per second, 60 frames per second, etc.), so that multiple positions of the device and of the OIS system can be determined for each video frame. Lens focus position data 146 may be captured at least once per image frame. The position data may be captured asynchronously relative to frame exposure, for example, with gyroscope sensor data and OIS position data being sampled at a rate that exceeds and is not necessarily synchronized with the beginning or end of image frame exposures.

The data obtained from the camera module 110 and other components is provided to the EIS module 155 for processing. This processing may occur while video capture is ongoing. For example, EIS processing can be performed in substantially real time, so that the video file that is made accessible to the user at the end of video capture has been stabilized by the EIS module 155. In some implementations, EIS processing may be performed at a later time, for example after video capture has completed, or by a device other than the one that recorded the video. The EIS module 155 can be implemented in hardware, firmware, software, or a combination or sub-combination of them.

The EIS module 155 includes a motion data handler 156 that periodically or continuously obtains updated device position data 150 from the device position sensor(s) 120. The motion data handler estimates the current camera pose from the device position data 150. For example, a gyroscope signal can be obtained and used to estimate a device position of the recording device 102 at a high frequency, for example, 200 Hz. This device position at a given time, t, is referred to below as R(t). This device position may indicate a rotational positon of the recording device 102 with respect to, for example, one, two, or three axes. The device position may be expressed as a rotation matrix, or with respect to a coordinate system, or in other forms. Each calculated device position can be labeled with a time indicating the time when that position of the recording device 102 occurred.

The EIS module 155 includes an OIS position data handler 158, which periodically or continuously obtains the OIS position readout illustrated as OIS position data 148. The OIS position data handler 158 converts the OIS readout values into offsets that can be used with the device positions.

For example, an OIS lens position can be converted to a two-dimensional pixel offset. To generate the offset, the OIS position data handler 158 can used the stored calibration data 132, which may provide conversion coefficients or matrices to translate from an OIS position to the corresponding offset. Generating the offset due to the OIS position can take into account changes in effective focal length of the camera over time, e.g., due to changes in lens focus position and/or lens zoom position if the camera module 110 is capable of optical zoom. Like the motion data handler 156, the OIS position data handler 158 labels each measurement and offset with the time that the data represents.

The EIS module includes a motion model constructor 160 that receives the device positions calculated by the device position data handler 156 and the OIS offsets calculated by the OIS position data handler 158. With this data and the frame exposure data 142 and the lens focus position data 146, the motion model constructor 160 generates a first transformation 162 for a frame. For example, the first transformation 162 can be a projection matrix that maps the real-world scene in view of the camera to the captured frame. This process is repeated for each frame. When generating the first transformation 162 for a frame, the positions of the OIS module 115 can be modeled as offsets from the principal device positions determined from gyroscope data. As discussed further below, the offsets can take into effect an effective focal length of the camera at the time of capture, by looking up the effective focal length for the lens focus position at the time. The first transformation 162 can separately describe the relationships of different subsets or regions of a single image frame. For example, different portions or components of the first transformation 162 may describe how different scanlines of a frame are mapped to the real-world scene. Device positions, OIS module positions, and lens focus positions can all be aligned using measurement timestamps, and interpolated as needed, to provide accurate positions at the time of exposure for individual scanlines of a frame.

The first transformation 162 generated by the motion model constructor 160 is provided to a non-linear filtering engine 170 which determines a second transformation 172. This second transformation 172 can be a second projection matrix $P'_{i,j}$ that projects image data for a frame to an output frame that represents a stabilized version of the frame. Specifically, the second transformation 172 can map the image projection made using the initial transformation 162, $Pi_{j}$, to the output frame rather than operating on the image data as captured. In some implementations, the two transformations 162, 172 can then be combined into a single transformation that operates on initially captured image data of a frame and directly maps it to a stabilized output frame.

To effectively stabilize movement, the non-linear filtering engine 170 can generate the second transformation 172 to take into account movement that will occur in the future, after the capture of frame being processed. For example, for a current frame under analysis, the position of the recording device may not have not moved significantly since the previous frame. Nevertheless, if the engine 170 determines that significant motion occurs in future frames, the second transformation 172 can be generated to shift or otherwise alter the current frame to introduce apparent movement in the video, so that large future movement can be spread out as a series of gradual changes rather than an abrupt change. Similarly, if stabilization of future frames introduces cropping or other changes, the second transformation 172 can be generated to at least partially propagate those changes to earlier frames for more gradual and consistent change over the series of frames.

The non-linear filtering engine 170 can generate the second transformation 172 from a virtual camera position for a frame. Rather than representing the actual position of the camera when exposure occurred, the virtual camera position can represent an adjusted or hypothetical pose of the recording device 102 that would stabilize the video being recorded. A virtual position can represent a desired position to place a virtual camera, e.g., a position that would simulate a particular view or perspective of a scene. In general, any camera position can be represented by its rotation and translation with respect to a global reference frame. The virtual camera position can be expressed as a rotation matrix, e.g., a matrix indicating rotational offsets relative to a reference position. This may be a 3×3 matrix that indicates rotational offsets with respect to 3 rotational axes. In some implementations, the stabilization processing of the EIS module defines positions only in terms of the rotational components, since these generally have the greatest impact on stability of handheld videos.

The virtual camera position for a frame can reflect adjustments to the estimated camera positions to enhance video stabilization, correct for distortion and operations, facilitate panning, and otherwise enhance the video. The virtual camera position for a frame can be determined by generating an initial camera position that is adjusted based on a variety of factors. For example, the virtual camera position can be adjusted through filtering of device positions based on movement detected before and after a frame, based on an amount of blur in the frame, based on a likelihood that panning is occurring, through adjustments to prepare for motion in future frames, and/or to ensure that image data covers an entire output frame. The various factors can be accounted for by generating a series of virtual camera positions for a frame that are altered, blended, or otherwise used to determine a final virtual camera position for the frame.

Just as the transformations 162, 172 can have different mappings for different scanlines, different virtual camera positions can be determined for different scanlines of a frame, to adjust for changes in device position, OIS module 115 position, and/or lens focus position during frame capture. Thus, different virtual camera positions can be used for different parts of a frame. For efficiency, virtual camera positions and corresponding components of the second transformation 172 can be calculated for a proper subset of the scanlines of an image sensor, then the appropriate data can be interpolated for the remaining scanlines. In various examples below, a single scanline, such as the center scanline of the image sensor, is discussed for simplicity. The techniques for fully computing virtual camera positions and corresponding projection matrix components can be used for multiple scanlines of an image frame, and even for each scanline individually if desired.

As used herein, a device position refers to a position of the recording device 102, e.g., as indicated by the device position data 150 (e.g., gyroscope data) and the output of the device position data handler 156. This device-level position indicates the pose or orientation of the recording device 102 without taking into account internal movement of the lenses of the camera module 110 or the movement of the OIS module 115. Also as used herein, a camera position indicates a position corresponding to an effective or estimated view of the camera. By taking into account shifts due to the OIS module 115 operation, lens breathing, and other factors, the camera position may be different from the device position. Further, camera positions may be virtual positions, e.g., approximations or hypothetical positions that reflect an enhanced or altered view of the camera rather than an actual view of the camera.

The EIS module 155 then uses an image warping engine 180 to use the output of the non-linear motion filtering engine 170 and map each captured image frame to an output frame. The second projection 172 can include components corresponding to each scanline of a frame, so that each part of the frame is mapped to the output space and each of the pixels of the output frame are defined. The processing of the EIS module 155 can be performed for each of the frames of the video.

Figure 2:
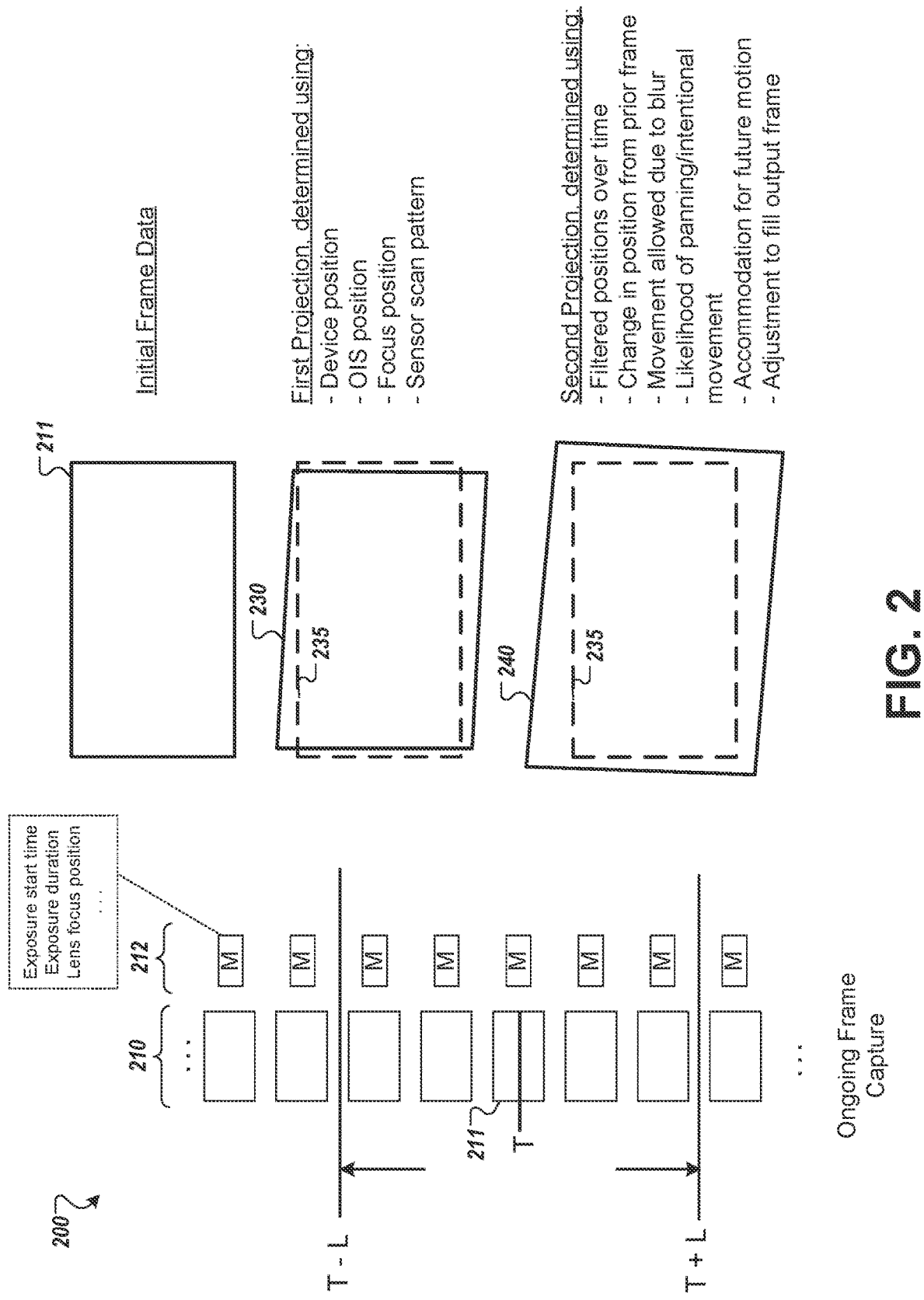
FIG. 2 is a diagram that illustrates an example of data used for video stabilization.

FIG. 2 is a diagram that illustrates an example of data used for video stabilization. The diagram shows a series of frames 210 that are captured by the recording device 102. Each frame is labeled with a corresponding set of metadata 212 that indicates, for example, exposure duration, an exposure reference time (e.g., a start time, a stop time, or other reference point for the exposure), a lens focus position, and so on. Although not illustrated, device position data and OIS module position data is captured at various times during each exposure and timestamped.

To perform stabilizing processing for a frame 211, a range of time around the capture of the frame 211 is defined. This range of time or window of frames is analyzed to determine how to transform the frame 211. The time of exposure, T, of the center scanline of the frame 211 under analysis can be used as the center of the range. A predetermined time offset, L, can be used to set the range, e.g., a time range from [T−L, T+L]. In some implementations, this time offset, L, is approximately 200 ms. As a result, the range would include about 7 frames before and about 7 frames after the frame 211. Larger and smaller time offsets, L, may be used. Because the EIS module 155 uses the context of future frames during processing, processing of a frame is delayed until the appropriate number of subsequent frames have been captured.

In FIG. 2, the frame 211 is shown as captured by an image sensor. As discussed above, the EIS module 155 defines a first transformation 162 from data indicating the real positions of the recording device 102 during capture of the frame 211, as well as positions of camera elements such as the OIS module elements and lens focus position. The result of applying the first transformation 162 is a projected image 230, shown with respect to an output frame target 235. In some implementations, the first transformation 162 is determined using only the data corresponding to the capture of the frame 211. The transformation 162 corresponds to the real lens position of the camera, and so the projected image 230 estimates a mapping between the image data and the actual scene in view of the camera.

The EIS module 155 uses a second transformation 162 to adjust the image data of the frame 211 further. This second transformation 162 corresponds to a virtual lens position, e.g., a hypothetical position that would have resulted in more stable video if used to capture the frame 211. This second transformation 162, when applied to the frame 211, produces the projected image 240 which fully defines the data for the output frame 235.

The second transformation 172 that produces the projected image 240 may be generated from data corresponding to each of the frames in the time range from [T−L, T+L]. The positions R(t) of the recording device 102 over this time period can be filtered to smooth motion over the range, for example, using a Gaussian filter. The result of filtering at time T, the exposure of the center scanline of the frame 211, can be used as an initial virtual camera position, $V_0(T)$. Even with filtering, there may be undesirable movement in the device positions or other factors that result in undesired motion. As a result the initial virtual camera position, $V_0(T)$, can be updated through a series of further operations. In some implementations, the positions R(t) that are filtered are positions that assume no OIS movement, thus the positions can be based on device position data 150 without taking into account OIS position data 148. In other implementations, OIS motion and offsets can be factored in to the set of positions that are filtered to generate the initial virtual camera position, $V_0(T)$.

For example, a second virtual camera position, $V_1(T)$ can be generated by interpolating position $V_0(T)$ with a camera position $V_F(T\_pre)$ for the previous frame based on an amount of motion occurring over future frames. The camera position for the previous frame can be a final virtual camera position, e.g., the position corresponding to the transformations used to generate the stabilized output version of the previous frame. The interpolation can align the apparent change of motion between the frame 211 and the previous frame, with the apparent change in motion between the frame 211 and future frames.

A third virtual camera position, $V_2(T)$, can be generated by interpolating $V_1(T)$ with the real device position R(T) based on an amount of camera motion blur present in the frame 211. This can reduce the amount of stabilization applied to reduce a viewer's perception of the blur. Since motion blur generally cannot be removed, this can decrease the stability of the video when appropriate, in order to produce a more natural result.

A fourth virtual camera position, $V_3(T)$, can be generated to simulate or represent a position occurring during consistent motion of the recording device 102 over the time range [T−L, T+L]. This position may be determined by applying a stable filter, such as a domain transform filter, to the estimated actual device positions, R(t), over the time range. Although the filter is applied to the same set of device positions used to generate $V_0(T)$, this step represents filtering of a different type. For example, $V_0(T)$ may be generated through filtering that smooths but generally follows the changes in estimated actual device positions over time, without imposing a predetermined shape or pattern. By contrast, $V_3(T)$ is generated by filtering the device patterns to conform to a predetermined, consistent motion pattern, such as substantially linear panning or other movement that may be potentially intended by a user of the recording device 102.

A fifth virtual camera position, $V_4(T)$, can be generated as an interpolation of $V_3(T)$ and $V_2(T)$. The EIS module 155 can assess whether the changes in device position over time likely represent panning of the recording device 102, and can weight the interpolation accordingly. If a high likelihood of panning is determined, then $V_4(T)$ is close to the estimated panning position $V_3(T)$. If the likelihood of panning is determined to be low, then $V_4(T)$ will be closer to position $V_2(T)$.

With the fifth virtual camera position, $V_4(T)$, the EIS module 155 can assess the coverage that a corresponding transformation would provide to the output frame 235. Since it is desired to fill the entire output frame 235 and not leave any pixels undefined, the EIS module 155 can determine a transformation such as a projection matrix, representing a view of the scene from the virtual camera position $V_4(T)$, and verify that the projected image would cover the output frame 235. To account for motion in future frames, the transformation can be applied to the portion of the scene captured by the future image frames. The transformation and the corresponding virtual camera position $V_4(T)$ can be adjusted so that the current frame and each of a set of future frames would all fully define the output frame 235 when mapped using the transformation. The resulting transformation may be set as the transformation 172 and can be used to generate the stabilized output frame 235 for the frame 211.

In some implementations, generating the stabilized output frame 235 for the frame 211 includes performing the EIS processing techniques discussed for the scanline exposed at time T for one or more other scanlines of the frame 211. For example, the processing may be performed for scanlines at certain intervals (e.g., every 100 scanlines, every 500 scanlines, etc.) or at certain reference points (e.g., one quarter and three quarters across the frame, or at the top of the frame and bottom of the frame). When the virtual camera positions and second transformation 172 are determined for only a proper subset of the scanlines of the frame 211, the transformations (e.g., corresponding portions of a projection matrix) for the scanlines are interpolated between the calculated positions. In this manner, an appropriate transformation is determined for each scanline, and each scanline may have a different transformation applied as a result. In some implementations, the full processing of generating virtual camera positions and a second transformation 172 may be done for each scanline of each frame, without relying on interpolation between data for different scanlines.

Once the frame 211 is mapped to the output frame 235, the result is saved and the EIS module 155 begins processing the next frame. The process continues until each of the frames of the video have been processed.

The various factors used to generate the virtual camera positions and resulting transformation can be used in combination or separately. For example, depending on the implementation, some of the interpolations and adjustments used to create virtual camera positions $V_0(T)$ to $V_4(T)$ may be omitted. For example, in different implementations, any of the filtered camera positions $V_0(T)$ to $V_3(T)$ may be used to determine a transformation to project data to an output frame, instead of using $V_4(T)$ for that purpose. Accordingly, using any of filtered camera position $V_0(T)$, $V_1(T)$, and $V_2(T)$ to generate a stabilizing transformation may still improve stability of video. Similarly $V_3(T)$ may be effective to stabilize video where panning is occurring. Many other variations are within the scope of the disclosure, even if taking into account a subset of the different factors discussed.

The techniques discussed can be applied in various ways. For example, rather than apply the two transformations 162, 172 sequentially to image data, the recording device can generate a single combined transformation that reflects the combined effects of both. Thus, generating stabilized image data using the transformations 162, 172 may can encompass the generation of further transformations or relationships that are ultimately used to stabilize the image data, rather than applying the transformations 162, 172 directly.

Figure 3A:
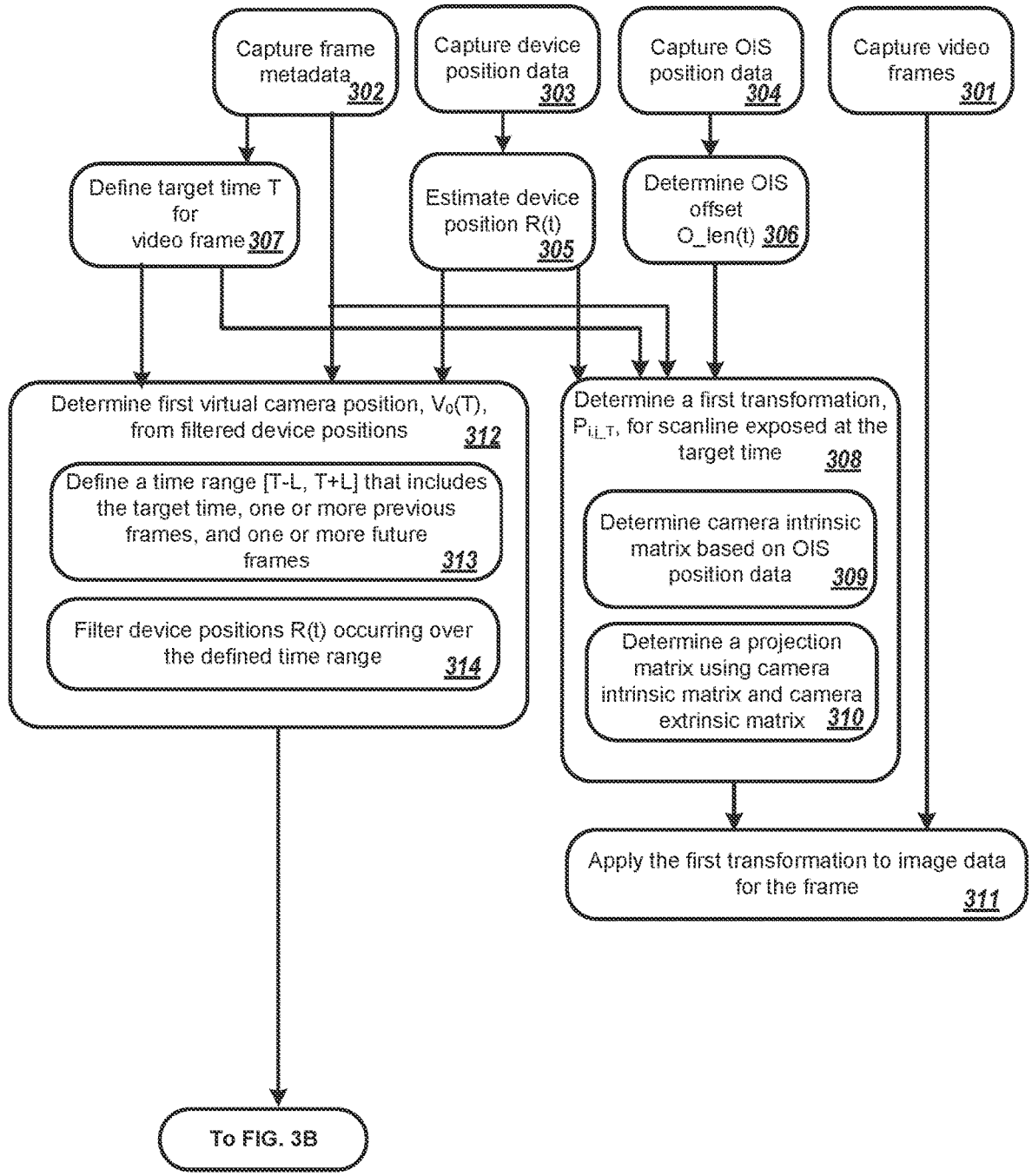
FIGS. 3A-3C show a flow diagram that illustrates an example of a process for video stabilization.
Figure 3B:
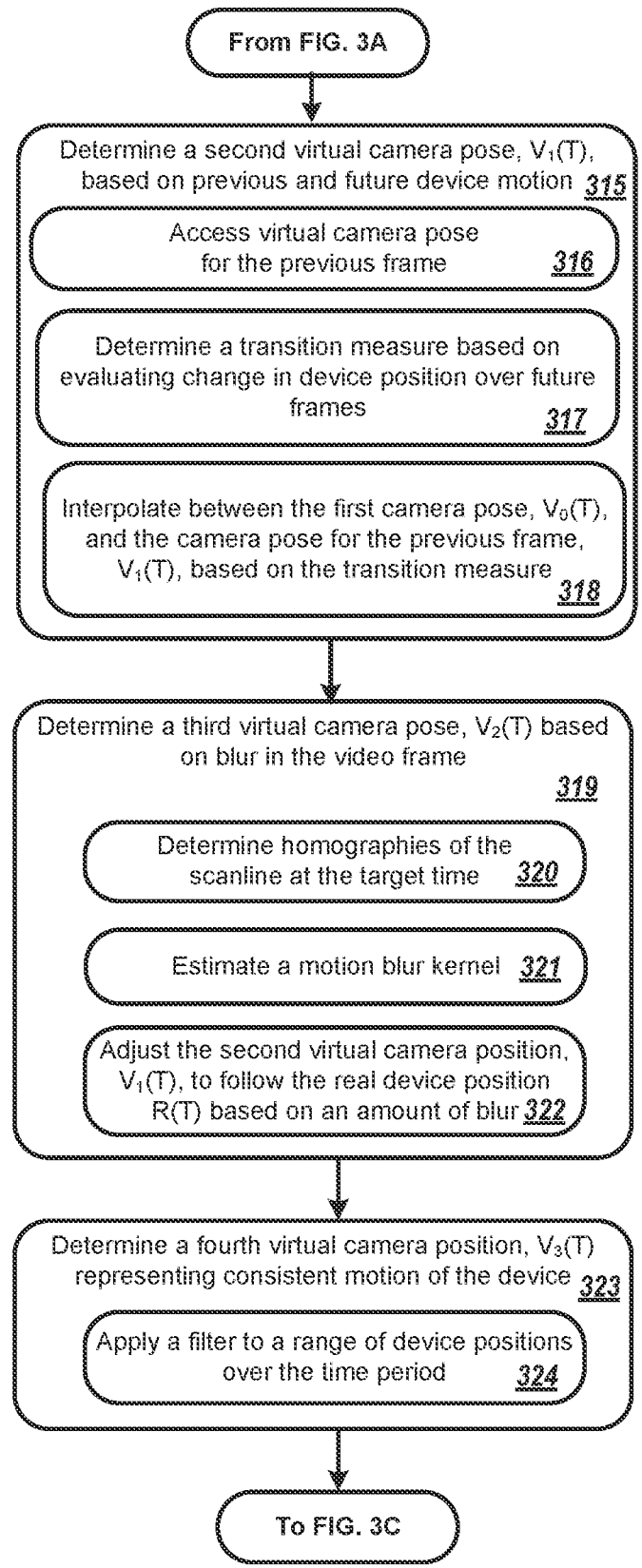
Figure 3C:
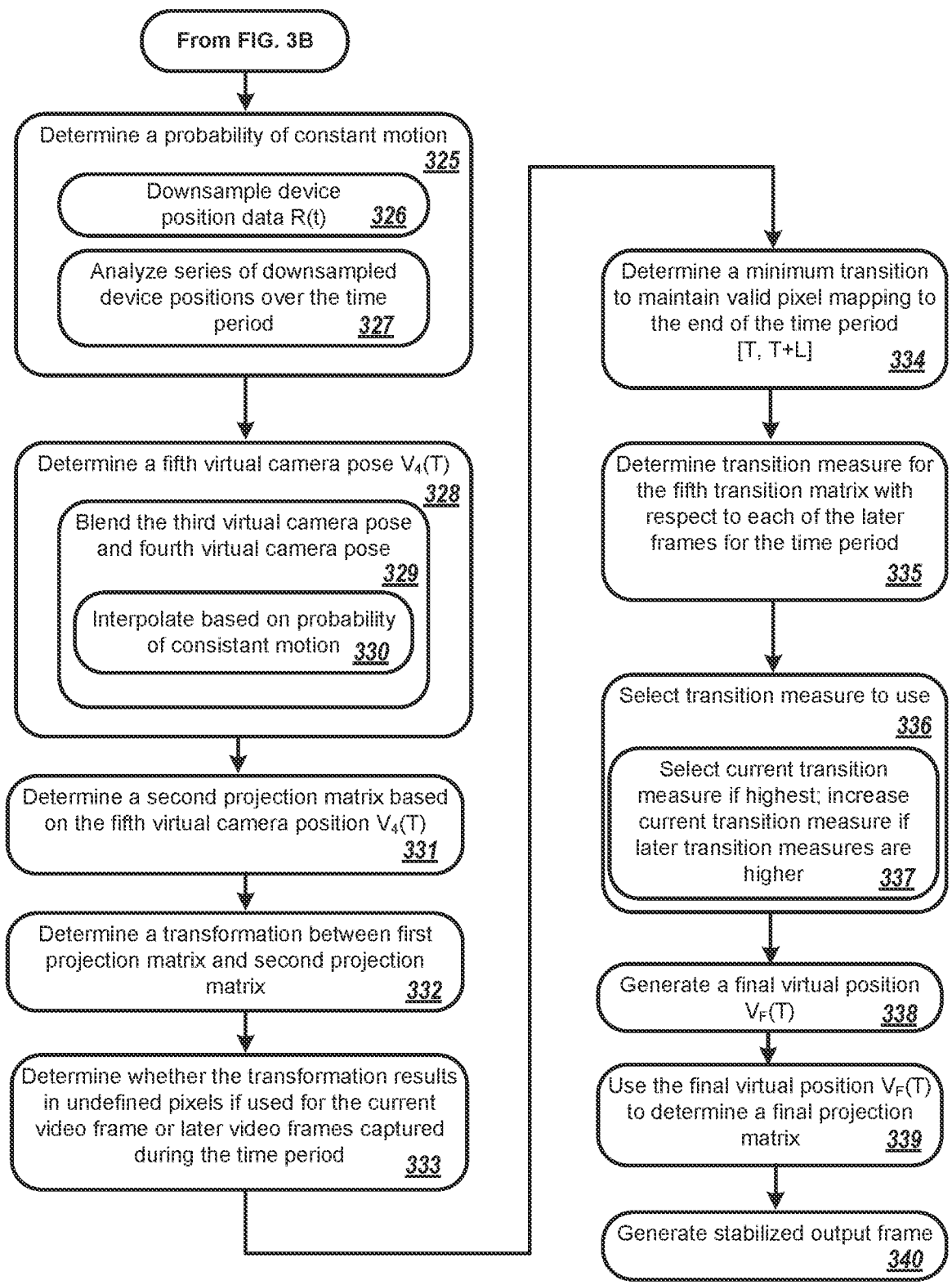

FIGS. 3A-3C show a flow diagram that illustrates an example of a process 300 for video stabilization. The process 300 shows a more detailed example of the techniques discussed in FIGS. 1 and 2. The actions of the process 300 can be performed by a computing system, such as the recording device 102 (e.g., a camera, a mobile phone, a tablet computer, etc.). The actions of the process 300 may be performed by a single computing device or multiple computing devices.

In the process 300, a series of video frames is captured (301). As the frames are captured, various other types of data are also captured. Metadata is captured for each frame (302), such as exposure time, exposure duration, lens focus position, zoom position if applicable, a camera identifier (e.g., if needed to specify which multiple cameras or lenses are used), and so on. Device position data is captured (303), such as gyroscope sensor data or other data that indicates an orientation of the recording device. OIS position data is captured (304), which indicates positions of a movable element of the OIS module (e.g., a lens shift position). The measurements for device position and OIS position can be made a higher frequency than the frame rate, so that one or more measurements are made for each frame that is captured. In various implementations, position measurements can be made at a 200 Hz or higher.

The device position data is processed to determine device positions occurring over the series of frames (305). The position may be indicate pose or orientation of the recording device in a coordinate system. For example, the position at time t may be indicated by a rotation matrix R(t). Several positions of the device can be estimated for each frame, representing device positions when different portions of the frame were captured. When processing a particular frame, the device positions occurring over a range of multiple frames will be used, so the device positions for frames before and after a frame under analysis can also be determined. In some implementations, the computing system continuously fetches a gyroscope signal and estimate the latest camera position R(t) at high frequency (e.g., 200 Hz).

The OIS position data is used to generate OIS offsets (306). Stored calibration data can indicate a table, function, or other data that maps OIS positions to offsets. For example, the OIS readout can be converted into a 2D pixel offset. As an example, the offset can be referred to as O_len(t)=(O_len(x, t), O_len(y, t)), showing that the offset has an x and a y component for each time t.

The manufacturer of the recording device can use an efficient calibration process, performed by one or more computers, to generate the calibration data that converts the raw OIS readout data into pixel offsets through a linear transformation. The calibration process can include an automatic data capture process, controlled by a script, to capture video while the OIS movable element (e.g., lens) is in various predetermined positions. The process can move the movable element in a predetermined pattern that covers the entire OIS motion field, while capturing video frames at incremental changes in position. For an OIS module with a movable lens, the motion may be a spiral sequence of motion around a center position of the movable lens. The one or more computers then detect key frames, e.g., by automatically marking frames representing incremental changes in position of a drive mechanism. The times of the key frames are then matched with the corresponding OIS position readout based on the timestamps for the key frames and OIS readout data. The one or more computers then use a feature detection algorithm to measure image shifts between key frames in pixel units. For example, the one or more computers can compare one key frame image to another key frame image and determine the pixel shifts in the x and y directions that correspond to the change in OIS readout positions for the two key frames. The one or more computers can then use a linear regression to determine a conversion coefficient or other data that maps OIS raw readouts to image shifts in pixel units. Typically the calibration process can be done generally for all camera modules of a particular type, and does not need to be performed for each individual device.

To perform stabilization processing, the computing system identifies a particular frame to process. The computing system defines a target time for the particular frame (307). For example, a time T when exposure of a center scanline occurred can be used as the target time. Typically this is the middle of the exposure duration for the particular frame. Because the frame metadata for each frame indicates a reference time (e.g., beginning and/or ending time of exposure) and exposure duration, the time corresponding to the center scanline can be determined for each frame.

The computing system determines a transformation for a scanline exposed at the target time (308). The transformation can be a projection matrix that maps the real world scene to the image. This projection matrix is referred to as $P_{i,j}$, where i is the frame index and j is the scanline index. The component of the matrix corresponding to the center scanline is $P_{i,j\_T}$. This transformation can be generated using the device position R(T) and OIS position offsets.

The OIS lens shift data can be modeled as an additional offset to a principal point in a frame, e.g., a center or origin point in the frame. This meets the physical intuition that the OIS lens moves around the origin during recording. To determine the projection matrix, the computing system can use $R_{i,j\_T}$, which is a camera extrinsic matrix (e.g., a rotation matrix) determined in step (305) from the device position data. The computing system can also determine a camera intrinsic matrix $K_{i,j\_T}$ (309). For example, the camera intrinsic matrix may be generated using the effective focal length, f, of the camera at time T, taking into account the lens focus position at the time. Calibration data can be used to look up the focal length corresponding to the lens focus position readout value. The camera intrinsic matrix $K_{i,j\_T}$ can be determined as a 3×3 matrix, e.g.:

[f0 Pt(x)+O_len(x,j_T)]

K(i,j_T)=[0 f Pt(y)+O_len(y,j_T)],

[0 0 1]

where f is the focal length of current frame, Pt is the 2D principal point which is set to the image center, and O_len (j_T) is the converted OIS readout in pixel at the scanline exposed at T. The projection matrix can be generated using the camera intrinsic matrix and the camera extrinsic matrix (310), according to the following equation, $P_{i,j\_T}=R_{i,j\_T}*K_{i,j\_T}$. The first transformation can be applied to the image data for the center scanline to project the center scanline (311).

In addition, the computing system can determine a first virtual camera position, $V_0(T)$ by filtering real device positions R(t) occurring during a window of time (312). The first transformation maps image data in the particular frame under analysis to a coordinate system. Virtual camera positions represent hypothetical views or perspectives of this mapped image data, which would adjust the mapping of the image data to the frame. The computing system defines a range of time around the target time, T (313). For example, the range can include a predetermined amount of time L before and after the target time T. For example, L may be 200 ms, 500 ms, etc. As a result, the defined time range [T−L, T+L] can include the exposure times for one or more frames before the particular frame being processed and one or more frames after the particular frame. The computing system filters the device positions R(t) (e.g., rotation matrices) occurring over the defined time range (314). For this step, the recording device positions, representing actual movement of the recording device is used, and so the positions that are filtered generally do not reflect adjustment due to OIS operation. For example, for this step, the computing system may assume the virtual camera always has zero OIS motion: O_len virtual(x,y)=(0,0). Nevertheless, in some implementations, changes in OIS position may be used to generate the positions that are filtered during this process. The filtering can be performed using a Gaussian filter with a large kernel (e.g., Sigma=6). This filtering may smooth the changes in device position over time and reduce the effect of random or brief changes in position. The filtered device position corresponding to the time T is set as the first virtual camera position, $V_0(T)$.

A second virtual camera position, $V_1(T)$ can be generated using information about recording device movement after the time T (315). The future motion can be assessed by evaluating device positions occurring after time T up to time T+L. The amount of movement occurring in the future can be used to calculate the second virtual camera position, $V_1(T)$, by interpolating the initial virtual camera position, $V_0(T)$, with a final virtual camera position V(T_pre) for the center scanline of the frame captured immediately before the frame 211. In this example, the virtual camera positions can be represented by rotation matrices, and so spherical interpolation can be used. The computing system accesses the virtual camera position V(T_pre) for the center scanline of the previous frame (316). The computing system then determines a transition measure based on changes in device position occurring after the particular frame being processed. For example, the amount of movement of the recording device 102 occurring after time T can be used to determine a transition coefficient, A, that sets whether the interpolation result will be closer to $V_0(T)$ or V(T_pre). In particular, the variability of device positions after T can be assessed. A measure of "protrusion" can be used to measure the variability. Intuitively, it refers to amounts that the warped frame protrudes the current and future frames if the previous virtual camera pose $V_F(T\_pre)$ remains unchanged. The larger the protrusion is, the larger the transition ratio or transition measure will be, and vice versa. The computing system can obtain the protrusion values for the current frame with respect to each of the future frames to T+L, calculate corresponding transition ratios, and average the transition ratios as the final transition ratio or transition measure.

The interpolation can be performed using a spherical linear interpolation, referred to herein as a function Slerp($p_0$, $p_1$, α)=sin((1−α)*θ)/sin(θ)*$p_0$+sin(α*θ)/sin(θ)*$p_1$, where α is the transition measure or transition coefficient, 0<=α<=1 is the ratio between point $p_0$ and $p_1$, and θ=arccos($p_0$·$p_1$) is the angle subtended by the arc formed from point $p_0$ to $p_1$. Thus, the camera position can be determined as $V_1(T)$=Slerp ($V_F(T\_pre)$, $V_0(T)$, A). If the motion remains consistent or changes slowly, the coefficient will be small, so the resulting camera position will be close to V(T_pre). If future motion is large, the coefficient will be large and the resulting camera position will be closer to $V_0(T)$. The computing system performs the interpolation (318), which can set the second virtual camera position, $V_1(T)$, to a position that smooths the rate of change that is apparent between frames, so the rate at which motion appears to change does not abruptly increase or decrease.

A third virtual camera pose, $V_2(T)$ can be generated from $V_1(T)$ based on the amount of motion present during frame capture, or the amount of motion blur present in the frame being processed (319). The virtual camera position $V_1(T)$ may be adjusted to more closely align with the real camera position, R(T), and so reflect motion that occurred between the previous frame and the frame 211. If a significant amount of motion blur is present in the frame 211 (e.g., due to camera movement, not subject movement) and the processed video is made very stable, the motion blur may become very noticeable and unnatural. To reduce a viewer's perception of the blur, the change in the virtual camera position from one frame to the next may be allowed to at least partially track the real camera position, consistent with the natural blur in the image. This can hide the blur to an extent. Accordingly, based on a determination of an amount of image blur in the frame 211, at least a portion of the real motion of the recording device 102 can be used to adjust the virtual camera position $V_1(T)$, for example, by interpolating between $V_1(T)$ and R(T) according to the amount of image blur detected.

To estimate an amount of motion blur for a frame, the computing system can determine homographies of the scanline at the target time T (320). The computing system then estimates a motion blur kernel (321). One technique for characterizing the blur is to compare the projection matrix components for two different positions along the frame. For example, for a frame with an exposure duration E, a projection matrix components $P_{i,T-E/2}$ and $P_{i,T+E/2}$ can be determined, representing the projection matrices corresponding to the first and last scanlines for the particular frame. Because the projection matrices are generated using OIS position data and lens focal length, blur caused by changes in these parameters is reflected in the transformation. The computing system then calculates a transformation between the two projection matrices, and applies the resulting transformation to an origin point representing the center point of the image. Applying the transformation will move the projected point to an offset from the actual origin in the projected space. The magnitude of the offset from the origin point may be used as an estimate of blur.

The computing system then adjusts the second virtual camera position, $V_1(T)$, toward the real device position R(T) to an extent determined based on the amount of blur identified (322). For example, the computing system can determine a coefficient based on the motion blur kernel, and use the coefficient to weight a spherical interpolation between positions $V_1(T)$ and R(T). This coefficient may be based on the offset discussed above. In some implementations, a threshold amount of blur is set, and interpolation with R(T) is only performed if the amount of blur exceeds a minimum amount represented by the threshold. For example, interpolation may be performed only if the offset represents motion that exceeds what OIS operation can typically compensate for.

The computing system determines a fourth virtual camera position, $V_3(T)$ representing consistent motion of the recording device over a series of frames (323). The virtual camera position $V_3(T)$ can be generated on an assumption that the user is panning the camera or performing another consistent motion over the time range [T−L, T+L], and so the position $V_3(T)$ should fall along a stable motion path. Accordingly, a stable filter may be applied to the real device positions R(t) over the time range [T−L, T+L] (324). As an example, a domain transform filter can be used. For example, this can infer a best fit trajectory of panning and indicate a corresponding position $V_3(T)$ along the trajectory.

The computing system determines a probability, S, that consistent motion (e.g., panning) of the recording device is occurring over a time range (325). This time range can correspond to the capture times of one or more future frames captured after the particular frame. For example, the time range of data assessed can be [T+L−K, T+L], where K>L. In general, a large amount of context prior to the time T can be beneficial to assessing the probability of panning. For example, panning may occur over a second or several seconds, usually significantly more than the value of L. As a result the value of K can be set to be e.g., 1 second, 2 seconds, 3 seconds, etc. The computing system can take advantage of a relatively long history of device positions determined over the course of the video capture. In some implementations, the beginning of the time range can be set at the beginning of the video, so that the analysis can assess the overall pattern of motion for the entire video prior to time T+L.

When generating the probability S, the computing system downsamples the device position data R(t) (326). For example, the rotational positions R(t) can be sampled at a 30 fps frame rate, which approximates the rate a human perceives, so that the probability calculation is more robust to slow movements and noise. The computing system analyzes the series of downsampled positions over the time period to determine the probability (327). For example, a linear regression can be used to generate a measure how well the downsampled positions match a linear trajectory. Other approaches can be used for the analysis. For example, a machine learning model can be trained to predict a likelihood of panning based on video examples that exhibit panning and video examples that do not reflect panning Generally, gyroscope signals provide high-quality position information which can allow reliable patterns to be learned by the machine learning model. As an example, a sigmoid function can be trained to produce the panning probability S.

The computing system determines a fifth virtual camera position $V_4(T)$ (328). This position can be generated by blending the third virtual camera position $V_2(T)$ and the fourth virtual camera position $V_3(T)$ (329). For example, the blending can be achieved by interpolating between the positions $V_2(T)$ and $V_3(T)$ based on the determined probability of consistent motion (330). If a high likelihood of panning is determined, then $V_4(T)$ is close to the estimated panning position $V_3(T)$. If the likelihood of panning is determined to be low, then $V_4(T)$ will be closer to position $V_2(T)$.

By this point in the process 300, the virtual camera position $V_4(T)$ provides stabilized motion due to filtering over a range of device positions and evaluation of future movement. The position has also been adjusted to hide motion blur and allow for panning if likely present. However, directly applying a projection determined for this position may leave some portions of the output frame undefined, e.g., with no image information from the particular frame mapped to the output frame. Further processing can adjust the virtual camera position further toward the real camera position, R(T), to ensure that each portion of the output frame is mapped to some portion of the particular frame.

The computing system determines a transformation, e.g., a second projection matrix $P_r(t)$, based on the fifth virtual camera position $V_4(T)$ (331). The computing system then determines a reference transformation between the first projection matrix $P_{i,j}$ (based on the real device position R(T)) to the second projection matrix (332). The computing system determines whether the reference transformation results in undefined pixels if used for the current video frame or later video frames captured during the time period (333). For example, for each frame captured during the time range [T, T+L], the projected image using the corresponding portion of $P_{i,j}$ for the frame can be determined, and the reference transformation can be applied to the projected image for the frame. The transformed projected image is then checked against the output frame to determine whether each of the pixels of the output frame has been defined. This check can be done for each frame captured during the time range [T, T+L]. In some implementations, if the output frame is defined for each frame captured during the time range, the second projection matrix $P_r(t)$ corresponding to the fifth virtual camera position $V_4(T)$ can be used to generate the stabilized version of the particular frame.

If the application of the reference transformation to the projected version of any frame captured during time range [T, T+L] does not define all the pixels of the output frame, the computing system determines a minimum transition to maintain valid pixel mappings for each frame to the end of the time period [T, T+L] (334). For example, if a frame having a center scanline at T' is not fully defined using the reference transform, a binary search can be used to find the minimal transition coefficient from $V_4(T)$ and R(T') so that all projected pixels are validly defined.

The computing system determines a transition measure for the fifth transition matrix $V_4(T)$ with respect to each of the later frames for the time period (335). The transition measure for a frame having a center scanline at T' may be a transition coefficient that, when applied to position $V_4(T)$, shifts from position $V_4(T)$ to real device position R(T'). The computing system selects a transition measure from among the various transition measures that are determined (336). The computing system can select the highest transition measure in a set. The set of transition measures may represent a comparison of the real device position $V_4(T)$ with respect to the real camera positions for each center scanline for frames occurring from [T, T+L]. Thus the set can include transition measures for: $V_4(T) \rightarrow R(T)$, $V_4(T) \rightarrow R(T+1)$, $V_4(T) \rightarrow R(T+L)$).

For example, the current transition measure, e.g., from the camera position $V_F(T)$ to the current real device position, R(T), can be selected if the current transition measure is higher than those used for transitions from the particular frame to a future frame. Otherwise, when the transition measure is highest for a transition from $V_4(T)$ to a future frame T", the computing system increases the current transition measure (337). The amount to which the current transition measure is increased may vary according to the amount of time between time T and time T". The shorter the amount of time, the more the current transition measure can be increased, e.g., the closer the current transition measure is to the transition measure from $V_4(T)$ to R(T").

Steps 336 and 337 can be expressed as follows. Using the techniques discussed above, the transition ratios for current and future frames can be a set ($tr_{(T+0)}$, $tr_{(T+1)}$, $tr_{(T+L)}$). First, the maximum ratio is found, along with, and its index i (0<=i<=L) indicating the position in the sequence of frames. If the maximum ratio is at the current frame (i=0), we set the final transition ratio to this value, e.g., $tr=tr_{(T+0)}$. Otherwise, the ratio is interpolated, e.g., as $tr=tr_{(T+0)}+(tr_{(T+i)}-tr_{(T+0)})/(i+1)$. As shown in this process, the use of index i in the calculation weights the interpolation according to how far in the future the highest-transition frame occurs relative to the current frame.

The computing system generates a final virtual position $V_F(T)$ (338). This can be performed using an interpolation between $V_4(T)$ and R(T), i.e., Slerp($V_4(T)$, R(T), tr), where tr is the transition ratio or transition measure determined in step 337. This can be done by modifying the fifth virtual camera position $V_4(T)$ by the minimal transition coefficient needed to fully define output for the frames in the range [T, T+L] and by using the selected transition measure to set an interpolation with respect to the current real device position R(T).

The computing system uses the final virtual position $V_F(T)$ to determine a final projection matrix $P'_{i,j}$ (339). Together, the first transformation indicated by the initial projection matrix $P_{i,j}$ and the second transformation indicated by the final projection matrix $P'_{i,j}$ map the image data in the particular frame as captured to the output frame. In other words, the first transformation maps the image data to an intermediate space based on the actual device position R(T), and the second transformation maps image data from the intermediate space to the output frame based on the final virtual camera position $V_F(T)$. The first transformation and the second transformation can be combined or otherwise used to generate a single mapping that can be applied to the particular frame to directly map image data to the output frame.

Various steps in the process 300 relate to determining transformations and virtual camera positions specifically for a particular scanline, e.g., the scanline exposed at time T. The same techniques can be used to determine transformations and virtual camera positions for other scanlines in the particular frame being processed. In general, only a proper subset of the scanlines of a frame may be processed using the techniques discussed above. For example, only top, bottom, and middle scanlines may be independently assessed. As another example, the center scanline and other scanlines occurring every 50 scanlines, every 200 scanlines, or every 500 scanlines apart may be processed. The remainder of the scanlines may have transformations interpolated between the few scanlines that are separately calculated.

The computing system uses the final transformations, having components determined for each scanline, to generate a stabilized output frame for the particular frame being processed (340). The stabilized output version of the frame is saved to a storage device as part of the video being recorded. The process 300 can be repeated for the next frame in the captured sequence of frames processed, and then the next until video capture ends and all captured frames have been processed. The capture of additional frames of the video, and corresponding position information, can proceed while captured frames are being processed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
   receiving a series of frames of a video captured by a recording device using an optical image stabilization (OIS) system;
   receiving (i) OIS position data indicating positions of the OIS system during capture of the series of frames, the OIS position data indicating, for at least some of the frames in the series of frames, multiple OIS position measurements for different times during capture of the frame, and (ii) device position data indicating positions of the recording device during capture of the series of frames;
   determining one or more transformations for a particular frame in the series of frames, the one or more transformations being determined based on the OIS position data for the particular frame and the device position data for the particular frame, wherein determining the one or more transformations comprises:
      determining a first virtual camera position for the particular frame; and
      determining, using the first virtual camera position and the device position data for the particular frame, a second virtual camera position;
   determining, based on the OIS position data for the particular frame, data characterizing motion blur in the particular frame; and
   based on the data characterizing the motion blur, generating a stabilized version of the particular frame using the one or more transformations, the stabilized version of the particular frame at least partially tracking the device position data for the particular frame.

2. The method of claim 1, wherein determining the second virtual camera position comprises interpolating, based on an amount of blur in the particular frame, between the first virtual camera position and a position of the recording device during capture of the particular frame.

3. The method of claim 2, wherein the amount of blur in the particular frame is determined by:
   determining a first projection matrix for a beginning of exposure of the particular frame;
   determining a second projection matrix for an end of exposure of the particular frame;
   determining a projection transformation between the first projection matrix and the second projection matrix;
   applying the projection transformation to an origin point representing a center point for the particular frame to generate a projected point, the projected point being an offset from the center point; and
   estimating, based on a magnitude of the offset, the amount of blur in the particular frame.

4. The method of claim 2, wherein the one or more transformations are determined based on the second virtual camera position.

5. The method of claim 1, the method further comprising:
   determining a future transition measure for a future frame occurring after the particular frame, the future transition measure indicating a difference between a position of the recording device for the particular frame and a position of the recording device for the future frame;
   determining whether the future transition measure is above a threshold amount; and
   in response to determining that the future transition measure being above the threshold amount, generating the stabilized version of the particular frame based at least in part on the future transition measure.

6. The method of claim 5, wherein the stabilized version of the particular frame is shifted to introduce apparent movement from the future frame.

7. The method of claim 1, the method further comprising:
   determining whether stabilization of a future frame occurring after the particular frame introduces cropping;

in response to determining that the stabilization of the future frame introduces the cropping, generating the stabilized version of the particular frame to introduce a portion of the cropping.

8. The method of claim 1, wherein the one or more transformations are further based on lens focus data indicating one or more lens focus positions used during capture of the particular frame.

9. The method of claim 1, wherein the one or more transformations comprise multiple transformations corresponding to multiple scanlines of the particular frame.

10. The method of claim 1, wherein:
receiving the OIS position data comprises receiving lens shift data indicating positions of a movable lens of the OIS system; and
receiving the device position data comprises receiving orientation or movement data from a gyroscope or an accelerometer of the recording device.

11. The method of claim 1, wherein:
the OIS position data indicates multiple OIS position readings for each frame in the series of frames; and
the device position data indicates multiple device position measurements for each frame in the series of frames.

12. A system comprising:
one or more processors; and
one or more machine-readable media storing instructions that, when executed by the one or more processors, cause the one or more processors to:
receive a series of frames of a video captured by a recording device using an optical image stabilization (OIS) system;
receive (i) OIS position data indicating positions of the OIS system during capture of the series of frames, the OIS position data indicating, for at least some of the frames in the series of frames, multiple OIS position measurements for different times during capture of the frame, and (ii) device position data indicating positions of the recording device during capture of the series of frames;
determine one or more transformations for a particular frame in the series of frames, the one or more transformations being determined based on the OIS position data for the particular frame and the device position data for the particular frame, wherein determining the one or more transformations comprises:
determining a first virtual camera position for the particular frame; and
determining, using the first virtual camera position and the device position data for the particular frame, a second virtual camera position;
determine, based on the OIS position data for the particular frame, data characterizing motion blur in the particular frame; and
based on the data characterizing the motion blur, generate a stabilized version of the particular frame using the one or more transformations, the stabilized version of the particular frame at least partially tracking the device position data for the particular frame.

13. The system of claim 12, wherein a determination of the second virtual camera position comprises interpolating, based on an amount of blur in the particular frame, between the first virtual camera position and a position of the recording device during capture of the particular frame.

14. The system of claim 13, wherein the amount of blur in the particular frame is determined by:

determining a first projection matrix for a beginning of exposure of the particular frame;
determining a second projection matrix for an end of exposure of the particular frame;
determining a projection transformation between the first projection matrix and the second projection matrix;
applying the projection transformation to an origin point representing a center point for the particular frame to generate a projected point, the projected point being an offset from the center point; and
estimating, based on a magnitude of the offset, the amount of blur in the particular frame.

15. The system of claim 13, wherein the one or more transformations are determined based on the second virtual camera position.

16. The system of claim 12, the one or more machine-readable media storing further instructions that, when executed by the one or more processors, cause the one or more processors to:
determine a future transition measure for a future frame occurring after the particular frame, the future transition measure indicating a difference between a position of the recording device for the particular frame and a position of the recording device for the future frame;
determine whether the future transition measure is above a threshold amount; and
in response to a determination that the future transition measure being above the threshold amount, generate the stabilized version of the particular frame based at least in part on the future transition measure.

17. The system of claim 16, wherein the stabilized version of the particular frame is shifted to introduce apparent movement from the future frame.

18. One or more non-transitory machine-readable media storing instructions that, when executed by one or more processors, cause the one or more processors to:
receive a series of frames of a video captured by a recording device using an optical image stabilization (OIS) system;
receive (i) OIS position data indicating positions of the OIS system during capture of the series of frames, the OIS position data indicating, for at least some of the frames in the series of frames, multiple OIS position measurements for different times during capture of the frame, and (ii) device position data indicating positions of the recording device during capture of the series of frames;
determine one or more transformations for a particular frame in the series of frames, the one or more transformations being determined based on the OIS position data for the particular frame and the device position data for the particular frame, wherein determining the one or more transformations comprises:
determining a first virtual camera position for the particular frame; and
determining, using the first virtual camera position and the device position data for the particular frame, a second virtual camera position;
determine, based on the OIS position data for the particular frame, data characterizing motion blur in the particular frame; and
based on the data characterizing motion blur in the particular frame, generate a stabilized version of the particular frame using the one or more transformations, the stabilized version of the particular frame at least partially tracking the device position data for the particular frame.

\* \* \* \* \*